US009875180B2

United States Patent
Talagala et al.

(10) Patent No.: US 9,875,180 B2
(45) Date of Patent: Jan. 23, 2018

(54) SYSTEMS AND METHODS FOR MANAGING STORAGE COMPRESSION OPERATIONS

(71) Applicant: SanDisk Technologies LLC, Plano, TX (US)

(72) Inventors: Nisha Talagala, Livermore, CA (US); Torben Mathiasen, Fredericia (DE); Dhananjoy Das, Sunnyvale, CA (US); David Flynn, Sandy, UT (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/334,502

(22) Filed: Jul. 17, 2014

(65) Prior Publication Data
US 2015/0242309 A1 Aug. 27, 2015

Related U.S. Application Data

(60) Provisional application No. 61/943,900, filed on Feb. 24, 2014.

(51) Int. Cl.
G06F 12/00 (2006.01)
G06F 12/02 (2006.01)
G06F 3/06 (2006.01)
G06F 17/30 (2006.01)
G06F 11/10 (2006.01)
(Continued)

(52) U.S. Cl.
CPC .......... G06F 12/0246 (2013.01); G06F 3/064 (2013.01); G06F 3/0608 (2013.01);
(Continued)

(58) Field of Classification Search
CPC ......... G06F 12/0246; G06F 2212/7201; G06F 2212/7202; G06F 3/0679; G06F 12/1009;
(Continued)

(56) References Cited

U.S. PATENT DOCUMENTS 5,237,460 A * 8/1993 Miller .................. G06F 3/0601 360/48
5,666,560 A * 9/1997 Moertl ................. G06F 3/0601 710/68

(Continued)

OTHER PUBLICATIONS

Nizameddin Ordulu, "InnoDB Compression Present and Future," MySQL User Conference and Expo 2013, Apr. 2013 [retrieved on Jan. 7, 2014], Retrieved from Internet <URL: http://www.percona.com/live/mysql-conference-2013/sites/default/files/slides/innodb_compression_present_and_future.pdf>.

(Continued)

Primary Examiner — Mardochee Chery
(74) Attorney, Agent, or Firm — Stoel Rives LLP

(57) ABSTRACT

A compression manager generates a reduced-size data set for a page. The reduced-size data set is stored on a storage medium by a storage module, and unused portions of the page are identified and/or recorded by the storage module. The reduced-size data set may be generated by compressing the page. The reduced-size data set may be written in response to a request from a client, which provides a message that identifies the unused portion(s) of the page. The page may be stored in a file, and the unused portion may correspond to empty portion(s) within the file. The storage module may maintain an index to map the page to the reduced-size data set, such that portions of the page are unmapped. The storage capacity used by the page may correspond to the mapped portion of the page, and exclude portion(s) of the page that are unmapped.

21 Claims, 13 Drawing Sheets

(51) Int. Cl.
   *G06F 12/0802* (2016.01)
   *G06F 12/1009* (2016.01)
   *G06F 12/10* (2016.01)

(52) U.S. Cl.
   CPC .......... *G06F 3/0679* (2013.01); *G06F 3/0688* (2013.01); *G06F 17/30* (2013.01); *G06F 11/1068* (2013.01); *G06F 12/0802* (2013.01); *G06F 12/10* (2013.01); *G06F 12/1009* (2013.01); *G06F 2212/401* (2013.01); *G06F 2212/7201* (2013.01); *G06F 2212/7202* (2013.01)

(58) Field of Classification Search
   CPC .. G06F 3/064; G06F 11/1068; G06F 12/0802; G06F 2212/401; G06F 12/10
   USPC ......................................................... 711/103
   See application file for complete search history.

(56) References Cited

U.S. PATENT DOCUMENTS

| | | | |
|---|---|---|---|
| 8,812,772 B2* | 8/2014 | Teo ..................... | G06F 12/0246 711/102 |
| 8,850,114 B2 | 8/2014 | Rosenband et al. | |
| 8,949,512 B2 | 2/2015 | Vogan et al. | |
| 2008/0148004 A1 | 1/2008 | Iren et al. | |
| 2012/0030408 A1* | 2/2012 | Flynn .................. | G06F 12/0246 711/102 |
| 2012/0131264 A1 | 5/2012 | Oikawa | |
| 2013/0166820 A1* | 6/2013 | Batwara .............. | G06F 12/0246 711/103 |
| 2015/0012689 A1* | 1/2015 | Atkisson ............. | G06F 12/0246 711/103 |
| 2015/0032945 A1 | 1/2015 | Marconcini | |
| 2015/0089121 A1 | 3/2015 | Coudhury et al. | |

OTHER PUBLICATIONS

"Linux Programmer's Manual, FALLOCATE (2)," Published on Internet at man7.org on Jan. 24, 2014 [online], 2014 [retrieved on Feb. 11, 2014], Retrieved from the Internet <URL: http://man7.org/linux/man-pages/man2/fallocate.2.html>.

Ordulu, Nizameddin, "INNODB Compression: Present and Future," MYSQL Worldwide Conference & Expo, Percona Live, Apr. 22-25, 2013, https://www.percona.com/live/mysql-conference-2013/sessions/innodb-compression-present-and-future, 18 pgs.

* cited by examiner

SYSTEMS AND METHODS FOR MANAGING STORAGE COMPRESSION OPERATIONS

TECHNICAL FIELD

This disclosure relates to storage systems and, in particular, to systems and methods for providing compression services.

BACKGROUND

A computing system may be configured to provide storage services to a storage client. The storage services may include block storage services in which a storage module provides a logical address space comprising a plurality of storage units (blocks) to the storage client. The blocks may represent physical storage capacity on a storage device (e.g., 8 kilobyte (kb) blocks). The storage client may be configured to compress data for storage. The storage client may, for example, compress 16 kb data blocks for storage within 8 kb logical blocks. Data that cannot be compressed for storage within individual 8 kb blocks may be split between multiple 8 kb blocks. This approach to storage compression may, however, increase the management overhead of the storage client, and reduce compression efficiency.

DETAILED DESCRIPTION

Figure 1A:
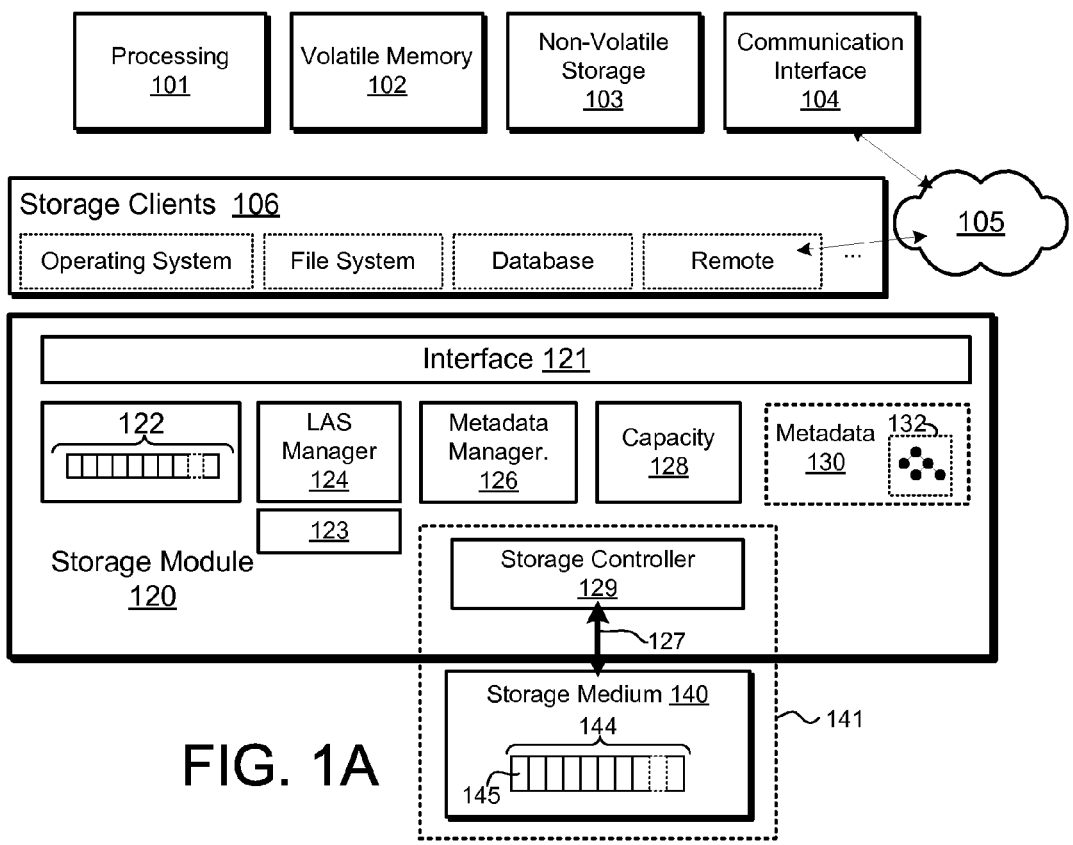
FIG. 1A is a block diagram of one embodiment of a computing system comprising a storage module to manage storage compression operations.

Disclosed herein are embodiments of systems, methods, and apparatus for managing storage compression operations. As used herein, "compression" refers to reducing the size of data (e.g., generating a smaller output data set from an input data set). Compression may include, but is not limited to: data compression, source coding, lossless data compression, lossy data compression, encryption, decryption, data de-duplication, data cloning, data differencing processing, and/or the like. The disclosed embodiments may compress data corresponding to pages. As used herein, a "page" refers to a logical construct that represents, corresponds to, and/or signifies a quantum of data. In certain embodiments, a page comprises and/or corresponds to a plurality of smaller units of data (blocks). As used herein, a block corresponds to, and/or signifies a quantum of data. A block may include, but is not limited to: a storage unit, a physical storage unit, a media storage unit, a logical storage unit (e.g., identifier, logical identifier, logical address, and/or the like), a data packet, a data segment, a sector, and/or the like. In some embodiments, blocks are defined to have a fixed size, which may correspond to the granularity at which storage operations are managed within a storage layer and/or module (e.g., the smallest size of read/write operations implemented by the storage module). Alternatively, in some embodiments, blocks are variably sized and may be referred to as objects, blobs, ranges, data sets, and the like. As used herein, the terms block, storage block, sector, data segment, data packet, and storage unit are used to refer to storage units that make up a page (e.g., are used interchangeably to refer to the "blocks" of a page). In one embodiment a page represents 16 kb of data, which may correspond to 32 512-byte blocks. Another page may represent 32 kb of data, which may correspond to 64 512-byte blocks. Pages may be used by a client, application, operation system, and/or user to store data, metadata, and/or a combination of data and metadata.

As disclosed herein, a method for managing storage compression comprises, receiving a request to write data of a page to a non-volatile storage medium, wherein the page represents a fixed number of blocks on a storage medium, directing a storage module to write data of the page on fewer blocks of the storage medium than the fixed number of blocks represented by the page, and identifying to the storage module, which blocks of the fixed number of storage blocks represented by the page do not contain data of the page.

The disclosed method may further include compressing the data of the page, such that directing the storage module to write the data of the page comprises directing the storage module to write the compressed data of the page. The page may be designated as a compressed page by a client. The page may correspond to a file, and directing the storage module to write the data of the page may comprise issuing a request to write the data of the page to the file. In some embodiments, identifying to the storage module, which blocks of the fixed number of storage blocks represented by the page do not contain data of the page comprises identifying an empty portion of the file and/or providing a deallocation message to the storage module that identifies blocks that do not contain data of the page.

As disclosed herein, an apparatus for managing storage compression comprises, a compression manager that receives a request to persist a page, wherein the page is defined to have a fixed amount of storage capacity, a reduction module that derives a data set from the page, wherein the data set is smaller than the fixed amount of storage capacity, and a file allocation module that issues a request to write the data set to a file associated with the page, and identifies an empty portion of the file to a file system. The file allocation module may specify an offset and length of the empty portion of the file and/or may identify unused logical block addresses of the file. In some embodiments, the reduction module derives the data set by compressing data of the page.

Disclosed herein are embodiments of a system, comprising a compression agent that generates compressed data of a page, wherein the page is sized to include a fixed number of sectors on a non-volatile storage medium, a storage module that writes the compressed data of the page on fewer sectors of the non-volatile storage medium than the fixed number of sectors, and a metadata management module that records which sectors corresponding to the page are not in use. The page may be associated with a plurality of identifiers of a logical address space. One or more of the identifiers may be assigned to compressed data of the page stored on the non-volatile storage medium, and one or more of the identifiers may be unassigned (e.g., not mapped to data on the non-volatile storage medium).

The page may comprise a set of logical addresses, and the apparatus may further include a logical address space management module that maintains an index that maps a first subset of the set of logical addresses to storage addresses on the storage medium, such that a second subset of the logical addresses are unmapped. The system may comprise a capacity module that determines a physical storage capacity used by the page based on the mappings of the index.

In some embodiments, the metadata management module records which sectors of the page are not in use by removing, from the index, one or more mappings pertaining to the set of logical addresses of the page. The metadata management module may direct the storage module to write persistent metadata on the non-volatile storage medium. The persistent metadata may be configured to identify sectors of the page that are not in use.

Further embodiments of an apparatus for managing storage compression may comprise a translation module that maps logical identifiers of a logical address space to storage units on a storage device, a storage module that writes data of a page associated with a set of logical identifiers of the logical address space to a subset of the logical identifiers associated with the page, and a logical address space management module that records that one or more of the logical identifiers associated with the page are unmapped. The data of the page may comprise compressed data, and the apparatus may further include a compression agent that generates the compressed data of the page. The translation module may assign the subset of logical identifiers to respective storage units storing the data of the page. In some embodiments, the disclosed apparatus comprises a capacity module that determines a storage capacity consumed by the page on the storage device based on the assignments between the subset of logical identifiers and the respective storage units. The logical address management module may remove a mapping between a particular logical identifier associated with the page and a storage unit on the storage device, and writes persistent metadata on the storage device that indicates that the particular logical identifier unmapped.

FIG. 1A is a block diagram of one embodiment of a computing system 100 comprising a storage module 120 that provides storage services to one or more clients 106. The computing system 100 may comprise any suitable computing device, including, but not limited to, a server, desktop, laptop, embedded system, mobile device, and/or the like. In some embodiments, the computing system 100 may include multiple computing devices, such as a cluster of server computing devices. The computing system 100 may comprise processing resources 101, volatile memory resources 102 (e.g., random access memory (RAM)), non-volatile storage resources 103, and a communication interface 104. The processing resources 101 may include, but are not limited to, general purpose central processing units (CPUs), application-specific integrated circuits (ASICs), and programmable logic elements, such as field programmable gate arrays (FPGAs), programmable logic arrays (PLGs), and the like. The non-volatile storage resources 103 may comprise a non-transitory machine-readable storage medium, such as a magnetic hard disk, a solid-state storage medium, an optical storage medium, and/or the like. The communication interface 104 may be configured to communicatively couple the computing system 100 to a network 105. The network 105 may comprise any suitable communication network including, but not limited to, a Transmission Control Protocol/Internet Protocol (TCP/IP) network, a Local Area Network (LAN), a Wide Area Network (WAN), a Virtual Private Network (VPN), a Storage Area Network (SAN), a Public Switched Telephone Network (PSTN), the Internet, and/or the like.

The storage module 120 may include an interface module 121, a logical address space (LAS) management module 124, a metadata management module 126, and a capacity module 128. The storage module 120 (and/or modules thereof) may be implemented in software, hardware, and/or a combination thereof. In some embodiments, portions of the storage module 120 are embodied as executable instructions, such as computer program code, which may be stored on a persistent, non-transitory storage medium, such as the non-volatile storage resources 103. The instructions and/or computer program code may be configured for execution by the processing resources 101. Alternatively, or in addition, portions of the storage module 120 may be embodied as machine components, such as general and/or application-specific components, programmable hardware, FPGAs, ASICs, hardware controllers, storage controllers, and/or the like.

The storage module 120 provides I/O services to clients 106. The clients 106 may include, but are not limited to, operating systems (including bare metal operating systems, guest operating systems, virtual machines, virtualization environments, and the like), file systems, database systems, remote clients (e.g., clients communicatively coupled to the computing system 100 and/or storage module 120 through the network 105), applications, and/or the like.

The storage module 120 may be configured to service I/O requests using a storage medium 140. The storage medium 140 may comprise any storage medium capable of storing data persistently. As used herein, "persistent" data storage refers to storing data on a persistent, non-volatile storage medium. The storage medium 140 may include non-volatile storage media such as solid-state storage media in one or more solid-state storage devices or drives (SSD), hard disk drives (e.g., Integrated Drive Electronics (IDE) drives, Small Computer System Interface (SCSI) drives, Serial Attached SCSI (SAS) drives, Serial AT Attachment (SATA)

drives, etc.), tape drives, writable optical drives (e.g., CD drives, DVD drives, Blu-ray drives, etc.), and/or the like.

In some embodiments, the storage medium 140 comprises non-volatile solid-state memory, which may include, but is not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), resistive random-access memory (RRAM), programmable metallization cell (PMC), conductive-bridging RAM (CBRAM), and/or the like. Although particular embodiments of the storage medium 140 are disclosed herein, the teachings of this disclosure could be applied to any suitable form of memory including both non-volatile and volatile forms. Accordingly, although particular embodiments of the storage module 120 are disclosed in the context of non-volatile, solid-state storage devices 140, the storage module 120 may be used with other storage devices and/or storage media.

In some embodiments, the storage medium 140 includes volatile memory, which may include, but is not limited to, RAM, dynamic RAM (DRAM), static RAM (SRAM), synchronous dynamic RAM (SDRAM), etc. The storage medium 140 may correspond to memory of the processing resources 101, such as a CPU cache (e.g., L1, L2, L3 cache, etc.), graphics memory, and/or the like. In some embodiments, the storage medium 140 is communicatively coupled to the storage module 120 by use of an interconnect 127. The interconnect 127 may include, but is not limited to, peripheral component interconnect (PCI), PCI express (PCI-e), serial advanced technology attachment (serial ATA or SATA), parallel ATA (PATA), Small Computer System Interface (SCSI), IEEE 1394 (FireWire), Fiber Channel, universal serial bus (USB), and/or the like. Alternatively, the storage medium 140 may be a remote storage device that is communicatively coupled to the storage module 120 through the network 105 (and/or other communication interface, such as a Storage Area Network (SAN), a Virtual Storage Area Network (VSAN), and/or the like). The interconnect 127 may, therefore, comprise a remote bus, such as a PCE-e bus, a network connection (e.g., Infiniband), a storage network, a Fibre Channel Protocol (FCP) network, HyperSCSI, and/or the like.

The storage module 120 may be configured to manage storage operations on the storage medium 140 by use of, inter alia, a storage controller 129. The storage module 120 may comprise software and/or hardware components including, but not limited to, one or more drivers and/or other software modules operating on the computing system 100, such as an operating system component, storage layer, storage service, file system, driver, storage driver, a storage stack, an I/O stack, an I/O driver, a filter driver, a user-level application, a kernel-level application, a storage service, a database, an application, and/or the like. The storage module 120 may, therefore, comprise and/or be embodied as a computer program product comprising computer-readable instructions and/or modules stored on a non-transitory storage medium. Alternatively, or in addition, the storage module 120 may comprise hardware components, such as hardware controllers, embedded controllers, embedded systems, firmware controllers, programmable logic elements, storage controllers, communication interfaces, and/or the like. Accordingly, in some embodiments, the storage module 120 comprises and/or is tied to particular machine components. The storage medium 140 may be embodied on a storage device 141. Portions of the storage module 120 and/or storage controller 129 may be implemented as hardware and/or software components (e.g., firmware) of the storage device 141, including, but not limited to: a controller of the storage device 141, firmware of the storage device 141, a driver of the storage device 141, an on-card controller, and/or the like.

In some embodiments, the storage controller 129 implements storage operations on particular storage locations or "storage units" 145 of the storage medium 140. As used herein, a "storage unit 145" refers to a quantum of data storage and, as such, refers to an embodiment of a block and/or sector. The storage units 145 of FIG. 1A comprise addressable storage locations on the storage medium 140 that are capable of storing data persistently. The storage units 145 may include, but are not limited to, storage blocks, sectors, pages, groups of pages (e.g., logical pages and/or offsets within a logical page), storage divisions (e.g., physical erase blocks, logical erase blocks, etc.), locations on a magnetic disk (e.g., cylinder, sector, head addresses), battery-backed memory locations, and/or the like. The storage units 145 may be addressable within a storage address space 144 of the storage medium 140. Storage addresses may correspond to physical addresses, media addresses, back-end addresses, address offsets, and/or the like. Storage addresses may correspond to any suitable storage address space 144, storage addressing scheme, and/or arrangement of storage units 145.

The storage module 120 may comprise an interface 121 through which clients 106 may access storage services provided by the storage module 120. The storage interface 121 may include one or more of a block device interface, a virtualized storage interface, one or more virtual storage units (VSUs), an object storage interface, a database storage interface, and/or other suitable interface and/or an Application Programming Interface (API).

The storage module 120 may provide for referencing storage resources through a front-end storage interface. As used herein, a "front-end storage interface" refers to an interface and/or namespace through which clients 106 may refer to storage resources of the storage module 120. A storage interface may correspond to a logical address space 122. The logical address space 122 may comprise a group, set, collection, range, and/or extent of identifiers. As used herein, an "identifier" or "logical identifier" (LID) refers to an identifier for referencing a source resource; LIDs may include, but are not limited to, names (e.g., file names, distinguished names, and/or the like), data identifiers, references, links, front-end identifiers, logical addresses, logical block addresses (LBAs), logical unit number (LUN) addresses, virtual unit number (VUN) addresses, virtual storage addresses, storage addresses, physical addresses, media addresses, back-end addresses, and/or the like. LIDs of the logical address space 122 may, therefore, represent and/or correspond to blocks (storage units 145), as used herein.

The logical capacity of the logical address space 122 may correspond to the number of LIDs in the logical address space 122 and/or the size and/or granularity of the storage resources referenced by the LIDs. In some embodiments, the logical address space 122 may be "thinly provisioned." As used herein, a thinly provisioned logical address space 122 refers to a logical address space 122 having a logical capacity that exceeds the physical storage capacity of the underlying storage resources (e.g., exceeds the storage capacity of the storage medium 140). In one embodiment, the storage module 120 is configured to provide a 64-bit logical address space 122 (e.g., a logical address space comprising 2^26 unique LIDs), which may exceed the physical storage capacity of the storage medium 140. The large, thinly provisioned logical address space 122 may allow clients 106 to efficiently allocate and/or reference contiguous ranges of LIDs, while reducing the chance of naming conflicts.

The LAS management module 124 may be configured to manage the logical address space 122, which may include, but is not limited to: managing allocation of LIDs within the logical address space 122, translate between the logical address space 122 and storage address space 144 (e.g., map LIDs to storage units 145 on the storage device 141 by use of the translation module 123 and/or forward map 132), manage LID deallocation, and so on. The LAS management module 124 may comprise a translation module 123 to translate LIDs of the logical address space 122 to storage units 145 on the storage device 141, such that the logical address space 122 is independent of storage address space 144 (e.g., there may be no set or pre-determined mappings between LIDs and storage units 145, such that each LID is capable of being mapped to any storage unit 145 within the storage address space 144). The LAS management module 124 may define a thinly provisioned and/or over-provisioned logical address space 122, such that the storage capacity represented by the logical address space 122 differs from the physical storage capacity of the storage device 141 (e.g., the logical address space 122 may be larger than the storage address space 144).

The storage module 120 may be configured to maintain metadata 130, which may include, but is not limited to, a forward map 132 comprising associations between LIDs and storage units 145, a reverse map pertaining to the contents of various storage divisions of the storage medium 140 (e.g., erase blocks, logical erase blocks, and so on), validity bitmaps, reliability testing and/or status metadata pertaining to the storage medium 140 (e.g., error rate, retirement status, wear level, wear rate, and so on), and/or the like. Portions of the storage metadata 130 may be maintained within the volatile memory resources 102 of the computing system 100. The metadata management module 126 may be configured to store portions of the metadata 130 (e.g., portions of the forward map 132) on persistent storage, such as the storage device 141 and/or non-volatile storage resources 103 of the computing system 100.

The clients 106 may reference storage resources through the logical address space 122 (reference data through LIDs of the logical address space 122). Accordingly, the logical address space 122 may correspond to a front-end, logical interface through which clients 106 access storage services of the storage module 120. The storage module 120 may present and/or provide access to the logical address space 122 to the clients 106 through, inter alia, the storage interface 121. The LAS management module 124 maintains mappings between the logical address space 122 and the storage address space 144. The mappings may be maintained in metadata 130, such as a forward map 132.

Figure 1B:
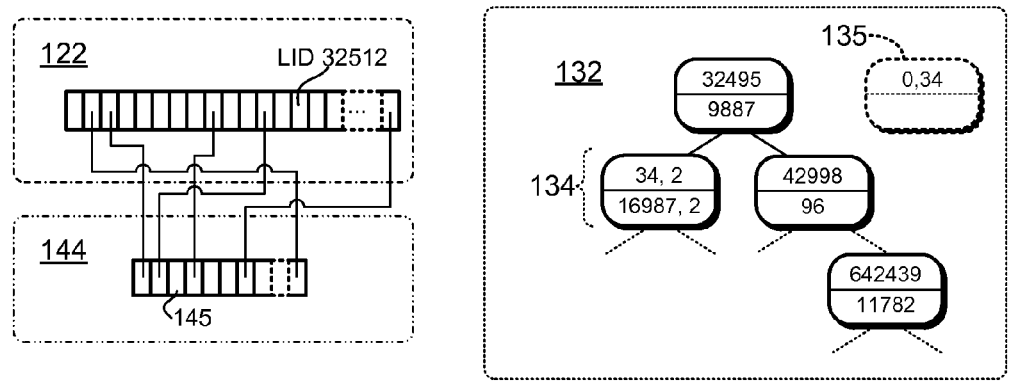
FIG. 1B depicts embodiments of storage metadata.

FIG. 1B depicts one embodiment of any-to-any mappings between the logical address space 122 and the storage address space 144. The any-to-any mappings may be maintained in one or more data structures of the storage metadata 130, such as the forward map 132. As illustrated in FIG. 1B, the LAS management module 124 may assign any LID to any storage unit 145. As further illustrated, the logical address space 122 may be sized differently than the underlying storage address space 144. In the FIG. 1B embodiment, the logical address space 122 may be thinly provisioned, and, as such, may comprise a larger range of LIDs than the range of storage addresses and/or storage units 145 available in the storage address space 144.

The forward map 132 may comprise any suitable data structure, including, but not limited to, an index, a map, a hash map, a hash table, a tree, a range-encoded tree, a b-tree, and/or the like. The forward map 132 may comprise entries 134 corresponding to LIDs that are currently in use to reference data stored on the storage medium 140. The entries 134 of the forward map 132 may assign LIDs to respective storage units 145 (through respective storage addresses within the storage address space 144). The forward map 132 may be sparsely populated and, as such, may omit entries corresponding to LIDs that are not currently allocated by a client 106 and/or are not currently being used to reference data stored on the storage medium 140. In some embodiments, the forward map 132 comprises a range-encoded data structure, such that one or more of the entries 134 represent a plurality of LIDs (e.g., a range, an extent, and/or a set of LIDs). In the FIG. 1B embodiment, the forward map 132 includes an entry 134 corresponding to a range of LIDs (34-35) mapped to a corresponding range of storage units 145 (storage addresses 16987-16988). In the FIG. 1B embodiment, the entries 134 of the forward map 132 are indexed by LID in a tree data structure. The disclosure is not limited in this regard, however, and could be adapted to use any suitable data structure and/or mapping mechanism.

As disclosed above, the forward map 132 may be capable of mapping any LID of the logical address space 122 to any storage unit 145 within the storage address space 144. Each LID may, therefore, represent a particular amount of storage capacity (a "block" or "sector", as disclosed above). The amount of storage capacity represented by a LID may correspond to the size of the storage unit(s) 145 referenced by the LIDs. Accordingly, the size of the storage unit(s) 145 may determine the granularity of storage operations performed on the storage device 141 (e.g., the size of the storage blocks represented by the LIDs of the logical address space 122). In some embodiments, the storage unit(s) 145 corresponds to 512-byte storage locations and, as such, each LID represents 512 bytes of storage capacity on the storage device 141. The storage module 120 may, therefore, have a block and/or sector size of 512 bytes. The disclosure is not limited in this regard, however, and could be adapted to use storage units 145 of any size, such that the LIDs represent any suitable storage capacity. In another embodiment, for example, the storage units 145 may correspond to 2 kb blocks, and the LIDs may, therefore, represent 2 kb blocks of storage capacity. In one embodiment, the storage module 120 implements variably sized blocks (e.g., storage units 145 having different sizes and/or capacities), such that different LIDs within the logical address space 122 represent and/or correspond to different amounts of storage capacity (e.g., different block sizes).

The LAS management module 124 may define a logical address space 122 that is thinly provisioned, such that the logical capacity represented by the LIDs within the logical address space 122 exceeds the storage capacity of the non-volatile storage medium 140. In one embodiment, for example, the logical address space 122 may comprise 2^64 LIDs that are configured to reference 512-byte storage units 145 on the storage medium 140. In this exemplary embodiment, the logical address space 122 corresponds to 2^63 kb of storage capacity (2^64 blocks, each block representing 512 bytes of storage capacity). The available physical storage capacity on the storage device 141 may differ from the storage capacity represented by the logical address space 122; the storage medium 140 may, for example, have only 2^32 available storage units 145.

The LAS management module 124 may manage the thinly provisioned logical address space 122 by, inter alia, managing physical storage resource consumption, such that only LIDs that are currently in use to reference valid data stored on the storage device 141 consume physical storage resources of the storage device 141. As illustrated in FIG. 1B, the forward map 132 may be sparsely populated and, as such, may omit entries 134 corresponding to LIDs that are not currently in use to reference data stored on the storage medium 140. Accordingly, LIDs that exist within the forward map 132 correspond to data stored on the storage medium 140, and LIDs that do not exist in the forward map 132 are not currently in use to reference data stored on the storage medium 140. As used herein, a LID "exists" in the forward map 132 if the forward map 132 comprises an entry 134 that binds, assigns, ties, and/or associates the LID with data stored on the storage medium 140. In the FIG. 1B embodiment, LIDs 34, 35, 32495, 42998, and 642439 exist in the forward map 132, since these LIDs are bound to storage unit 145 in respective entries 134. Other LIDs within the logical address space 122 do not exist.

The storage module 120 comprises a capacity module 128 that, inter alia, tracks physical storage resource usage. As disclosed above, the LAS management module 124 may be configured to manage the sparse, thinly-provisioned logical address space 122, such that physical storage resources are only consumed by LIDs that are currently in use to reference valid data on the storage device 141. The capacity module 128 may determine the physical storage capacity that is currently in use (has been consumed) by use of, inter alia, the forward map 132. In the FIG. 1B embodiment, the capacity module 128 may determine that five LIDs are bound to respective storage units 145 and, as such, the logical address space 122 is currently consuming the equivalent of five blocks of storage capacity (e.g., 2.5 kb). The remaining physical storage capacity may be the total physical storage capacity of the storage device 141 less 2.5 kb.

In some embodiments, the LAS management module 124 is further configured to manage allocations of logical resources (e.g., LIDs). LIDs may be reserved for use by particular clients 106, particular data structures (e.g., files), and the like. As used herein, a LID that is "reserved" refers to a LID that has been designated for use by a particular entity. A reserved LID may, or may not, correspond to data stored on the storage device 141. A client 106 may, for example, reserve a range of LIDs (e.g., LIDs 0-33), but may not immediately store data to the LIDs. The LAS management module 124 may be configured to track LID reservations by use of the metadata 130, such as the forward map 132. In the FIG. 1B embodiment, the forward map 132 includes a reservation entry 135, configured to indicate that LIDs 0-33 (LID 0, length 34) have been reserved. The reservation entry 135 of FIG. 1B may not bind the reserved LIDs to data on the storage medium 140 (e.g., storage units 145) and, as such, may not consume physical storage resources on the storage medium 140 until data is written to the reserved LIDs. In some embodiments, the client 106 may write data to a subset of a set of reserved LIDs. For example, the client may write data to LIDs 8 and 24 without writing data to LIDs 0-7, 9-23, and/or 25-33. In response, the LAS management module 124 may create one or more entries 134 to bind LIDs 8 and 24 to respective storage units 145, whereas the other reserved LIDs remain unbound. Accordingly, the metadata 130 may indicate that the reserved set of LIDs 0-33 consumes only the equivalent of two storage units 145 of physical storage capacity, as opposed to the equivalent of the full 34 storage units of physical storage capacity. Although FIG. 1B depicts the reservation entry 135 in the forward map 132, the disclosure is not limited in this regard, and could be adapted to maintain LID reservation information in a separate data structure, such as a dedicated LID reservation map, a free LID map, and/or the like. Further embodiments of systems and methods for managing storage resource reservations and/or allocation are disclosed in U.S. Pat. No. 8,578,127 entitled, "Apparatus, System, and Method for Allocating Storage," issued on Nov. 5, 2013 to David Flynn et al., which is hereby incorporated by reference in its entirety.

Figure 1C:
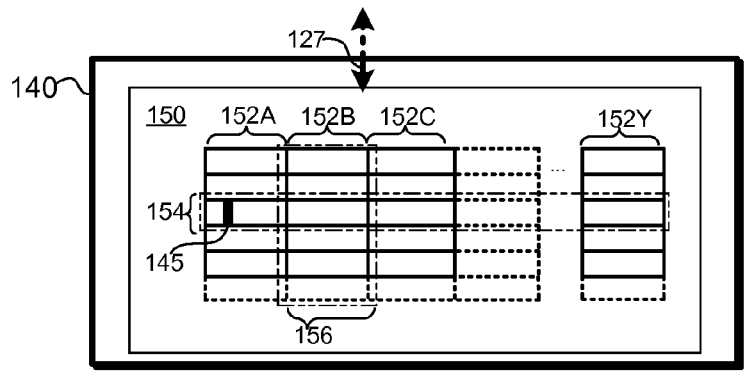
FIG. 1C depicts embodiments of a storage array.

Referring to FIG. 1C, in some embodiments, the storage medium 140 may comprise a solid-state storage array 150 comprising a plurality of solid-state storage elements 152A-Y. As used herein, a solid-state storage array (or storage array) 150 refers to a set of two or more independent columns 156. A column 156 may comprise one or more solid-state storage elements 152A-Y that are communicatively coupled in parallel using, inter alia, the interconnect 127. As used herein, a solid-state storage element 152A-Y includes, but is not limited to, solid-state storage resources embodied as a package, chip, die, plane, printed circuit board, and/or the like.

Rows 154 of the storage array 150 may comprise physical storage units of the respective columns 156 (solid-state storage elements 152A-Y). The solid-state storage elements 152A-Y comprising the array 150 may be capable of independent operation. Accordingly, a first one of the solid-state storage elements 152A may be capable of performing a first storage operation while a second solid-state storage element 152B performs a different storage operation. For example, the solid-state storage element 152A may be configured to read data at a first physical address, while another solid-state storage element 152B reads data at a different physical address.

A solid-state storage array 150 may also be referred to as a logical storage element (LSE). As disclosed in further detail herein, the solid-state storage array 150 may comprise logical storage units (rows 154). As used herein, a "logical storage unit" or row 154 refers to a combination of two or more physical storage units, each physical storage unit on a respective column 156 of the array 150. A logical erase block refers to a set of two or more physical erase blocks, a logical page refers to a set of two or more pages (and/or other storage units of a solid-state storage element 152), and so on. In some embodiments, a logical erase block may comprise erase blocks within respective logical storage elements 150 and/or banks. Alternatively, a logical erase block may comprise erase blocks within a plurality of different arrays 150 and/or may span multiple banks of solid-state storage elements. A logical storage unit or row 154 may comprise a plurality of storage units 145 (blocks). Therefore, the address of storage unit 145 may comprise an address of a logical storage unit or row 154 and an offset within the logical storage unit or row 154.

Figure 1D:
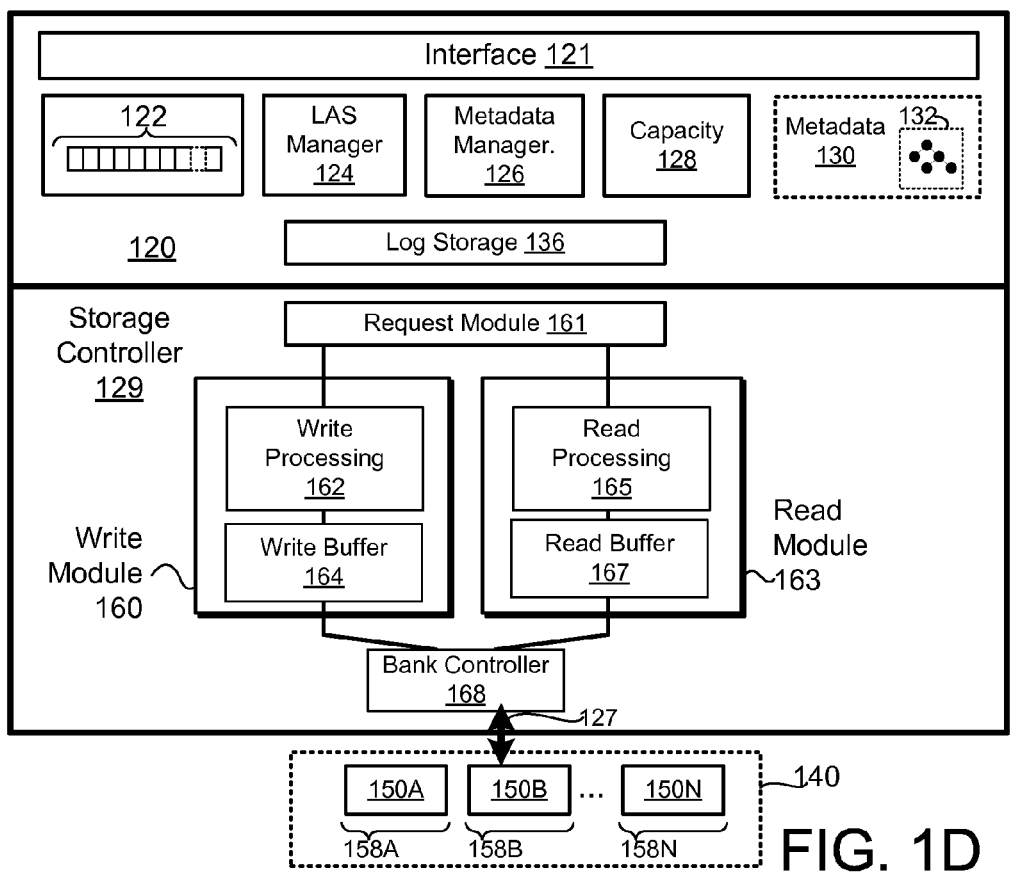
FIG. 1D is a block diagram that illustrates further embodiments of a storage module.

Referring to FIG. 1D, the storage module 120 may further comprise a log storage module 136 configured to store data on the storage medium 140 in a log structured storage configuration (e.g., in a storage log). As used herein, a "storage log" or "log structure" refers to an ordered arrangement of data within the storage address space 144 of the storage medium 140. Data in the storage log may comprise and/or be associated with persistent metadata. The storage log on the storage medium 140 may, therefore, comprise data stored in a contextual, self-describing format. In some embodiments, the persistent metadata may be configured to identify the data, and as such, may comprise and/or reference the logical interface of the data (e.g., may comprise the LID(s) associated with the data). The persistent metadata may include other information, including, but not limited to, information pertaining to the owner of the data, access controls, data type, relative position or offset of the data, information pertaining to storage operation(s) associated with the data (e.g., atomic storage operations, transactions, and/or the like), log sequence information, data storage parameters (e.g., compression algorithm, encryption, etc.), and/or the like.

Figure 1E:
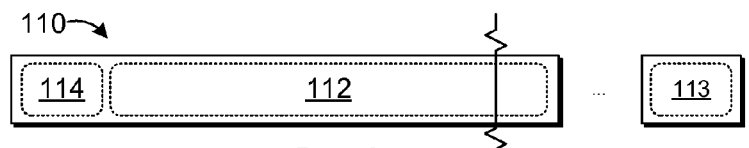
FIG. 1E depicts embodiments of a data packet.

FIG. 1E illustrates one embodiment of a contextual data format. The data packet 110 depicted in FIG. 1E comprises a data segment 112 and persistent metadata 114. The data segment 112 may be of any arbitrary length and/or size. The size of the data segments 112 of the packet format 110 may determine, inter alia, the granularity of storage operations performed by the storage module 120 (e.g., the block size for individual read and/or write operations). The size of the data segments 112 may, therefore, determine the size of the storage units 145 on the storage medium 140 (e.g., determine the block size of the logical address space 122). As disclosed above, the data segment size 112 may be set to 512 bytes and, as such, the LIDs of the logical address space 122 may represent 512-byte storage blocks. The disclosure is not limited in this regard, however, and could be adapted to implement data packets 110 comprising any suitable data segment size, corresponding to any block size, including, inter alia, variable data segment sizes, resulting in variable and/or configurable block sizes.

The persistent metadata 114 may be embodied as one or more header fields of the data packet 110. As disclosed above, the persistent metadata 114 may comprise the logical interface of the data segment 112 and, as such, may include the LID(s) associated with the data segment 112. Although FIG. 1E depicts a packet format 110, the disclosure is not limited in this regard and could associate data (e.g., data segment 112) with contextual metadata in other ways including, but not limited to, an index on the storage medium 140, a storage division index, and/or the like. Data packets 110 may be associated with persistent sequence information 113. The persistent sequence information 113 may be used to determine the relative order of the data packets 110 within the storage log. In some embodiments, data packets are appended sequentially within storage divisions of the storage medium 140. The storage divisions may correspond to erase blocks, logical erase blocks, or the like. Each storage division may be capable of storing a large number of data packets 110. The relative position of the data packets 110 within a storage division may determine the order of the packets 110 within the storage log. The order of the storage divisions may be determined, inter alia, by storage division sequence information 113. Storage divisions may be assigned respective sequence information 113 at the time the storage division is initialized for use (e.g., erased), programmed, closed, or the like. The storage division sequence information 113 may determine an ordered sequence of storage divisions within the storage address space 144. Accordingly, the relative order of a data packet 110 within the storage log may be determined by: a) the relative position of the data packet 110 within a particular storage division and b) the order of the storage division relative to other storage divisions in the storage address space 144.

Referring back to FIG. 1D, in some embodiments, the storage medium 140 comprises a plurality of independent banks 158A-N, each of which may comprise one or more storage arrays 150A-N. Each independent bank 158A-N may be coupled to the storage controller 129 via the interconnect 127.

The storage controller 129 may comprise a storage request receiver module 161 configured to receive storage requests from the storage module 120 via an interconnect 127. The storage request receiver module 161 may be further configured to transfer data to/from the storage module 120 and/or clients 106. Accordingly, the storage request receiver module 161 may comprise one or more direct memory access (DMA) modules, remote DMA modules, bus controllers, bridges, buffers, and so on.

The storage controller 129 may comprise a write module 160 that is configured to store data on the storage medium 140 in response to requests received via the request module 161. The storage requests may comprise and/or reference the logical interface of the data pertaining to the requests. The write module 160 may be configured to store the data in a self-describing storage log, which, as disclosed above, may comprise appending data packets 110 sequentially within the storage address space 144 of the storage medium 140. The data packets 110 may comprise and/or reference the logical interface of the data (e.g., may comprise the LID(s) associated with the data). The write module 160 may comprise a write processing module 162 configured to process data for storage. Processing data for storage may comprise one or more of: a) compression processing, b) encryption processing, c) encapsulating data into respective data packets 110 (and/or other containers), d) performing error-correcting code (ECC) processing, and so on. A write buffer 164 may be configured to buffer data for storage on the storage medium 140. In some embodiments, the write buffer 164 may comprise one or more synchronization buffers configured to synchronize a clock domain of the storage controller 129 with a clock domain of the storage medium 140 (and/or interconnect 127).

The log storage module 126 may be configured to select storage location(s) for data storage operations and may provide addressing and/or control information to the storage arrays 150A-N of the independent banks 158A-N. As disclosed herein, the log storage module 126 may be configured to append data sequentially in a log format within the storage address space 144 of the storage medium 140. The log storage module 126 may be further configured to store data in a contextual format and/or with persistent metadata that defines the logical interface of the data (e.g., identifies the LIDs assigned to the data).

Storage operations to write data to the storage medium 140 may comprise: a) appending one or more data packets 110 to the storage log on the storage medium 140, and b) updating metadata 130 to associate LID(s) of the data with the storage addresses of the one or more data packets (e.g., in the forward map 132). In some embodiments, the metadata 130 may be maintained on memory resources of the storage controller 129 (e.g., on dedicated volatile memory resources of the storage device 141 comprising the storage medium 140). Alternatively, or in addition, portions of the metadata 130 may be maintained within the storage module 120 (e.g., on the volatile memory resources 102 of the computing system 100). In some embodiments, the metadata 130 may be maintained in a volatile memory by the storage module 120, and may be periodically stored on the storage medium 140.

The storage controller 129 may further comprise a data read module 163 configured to read data from the storage log on the storage medium 140 in response to requests received via the storage request receiver module 161. The requests may comprise LID(s) of the requested data, a storage address of the requested data, and/or the like. The read module 163 may be configured to: a) determine the storage address(es) of the data packet(s) 110 comprising the requested data by use of, inter alia, the forward map 132, b) read the data packet(s) 110 from the determined storage address(es) on the storage medium 140, and c) process data for use by the requesting entity. Data read from the storage medium 140 may stream into the read module 163 via a read buffer 167. The read buffer 167 may comprise one or more read synchronization buffers for clock domain synchronization, as described above. A read processing module 165 may be configured to processes data read from the storage medium 140, which may include, but is not limited to, one or more of: a) decompression processing, b) decryption processing, c) extracting data from one or more data packet(s) 110 (and/or other containers), d) ECC processing, and so on.

The storage controller 129 may further comprise a bank controller 168 configured to selectively route data and/or commands of the write module 160 and/or read module 163 to/from particular independent banks 158A-N. In some embodiments, the storage controller 129 is configured to interleave storage operations between the independent banks 158A-N. The storage controller 129 may, for example, read from the storage array 150A of bank 158A into the read module 163, while data from the write module 160 is being programmed to the storage array 150B of bank 158B. Further embodiments of systems and methods for data storage on storage arrays 150 and/or multi-bank storage operations are disclosed in U.S. patent application Ser. No. 11/952,095 entitled, "Apparatus, System, and Method for Managing Commands for Solid-State Storage Using Bank Interleave," filed Dec. 12, 2006 for David Flynn et al., and U.S. patent application Ser. No. 13/784,705 entitled, "Systems and Methods for Adaptive Data Storage," filed Mar. 4, 2013 for David Flynn et al., each of which is hereby incorporated by reference.

The write processing module 162 may be configured to encode data packets 110 into ECC codewords. As used herein, an ECC codeword refers to data and corresponding error detection and/or correction information. The write processing module 162 may be configured to implement any suitable ECC algorithm and/or generate ECC codewords of any suitable type, which may include, but are not limited to, data segments and corresponding ECC syndromes, ECC symbols, ECC chunks, and/or other structured and/or unstructured ECC information. ECC codewords may comprise any suitable error-correcting encoding, including, but not limited to, block ECC encoding, convolutional ECC encoding, Low-Density Parity-Check (LDPC) encoding, Gallager encoding, Reed-Solomon encoding, Hamming codes, Multidimensional parity encoding, cyclic error-correcting codes, BCH codes, and/or the like. The write processing module 162 may be configured to generate ECC codewords of a pre-determined size. Accordingly, a single packet may be encoded into a plurality of different ECC codewords and/or a single ECC codeword may comprise portions of two or more data packets. Alternatively, the write processing module 162 may be configured to generate arbitrarily sized ECC codewords. Further embodiments of error-correcting code processing are disclosed in U.S. patent application Ser. No. 13/830,652 entitled, "Systems and Methods for Adaptive Error-Correction Coding," filed Mar. 14, 2013 for Jeremy Fillingim et al., which is hereby incorporated by reference.

In some embodiments, the storage module 120 manages an asymmetric, write-once storage medium 140, such as a solid-state storage medium, flash storage medium, or the like. As used herein, a "write-once" storage medium refers to a storage medium that is reinitialized (e.g., erased) each time new data is written or programmed thereon. As used herein, an "asymmetric" storage medium refers to a storage medium that has different latencies for different types of storage operations. In some embodiments, for example, read operations may be faster than write/program operations, and write/program operations may be much faster than erase operations (e.g., reading the media may be hundreds of times faster than erasing, and tens of times faster than programming the storage medium). The storage medium 140 may be partitioned into storage divisions that can be erased as a group (e.g., erase blocks). As such, modifying a single data segment "in-place" may require erasing the entire erase block comprising the data and rewriting the modified data to the erase block, along with the original, unchanged data. This may result in inefficient "write amplification," which may excessively wear the media. In some embodiments, therefore, the storage module 120 may be configured to write data "out-of-place." As used herein, writing data "out-of-place" refers to updating and/or overwriting data at different storage location(s) rather than overwriting the data "in-place" (e.g., overwriting the original physical storage location of the data). Updating and/or overwriting data out-of-place may avoid write amplification, since existing, valid data on the erase block with the data to be modified need not be erased and recopied. Moreover, writing data out-of-place may remove erasure from the latency path of many storage operations, such that erasure latency is not part of the "critical path" of write operations.

The storage module 120 may be configured to perform storage operations out-of-place by use of, inter alia, the log storage module 136. The log storage module 136 may be configured to append data at a current append point within the storage address space 144 in a manner that maintains the relative order of storage operations performed by the storage module 120, forming a "storage log" on the storage medium 140.

Figure 1F:
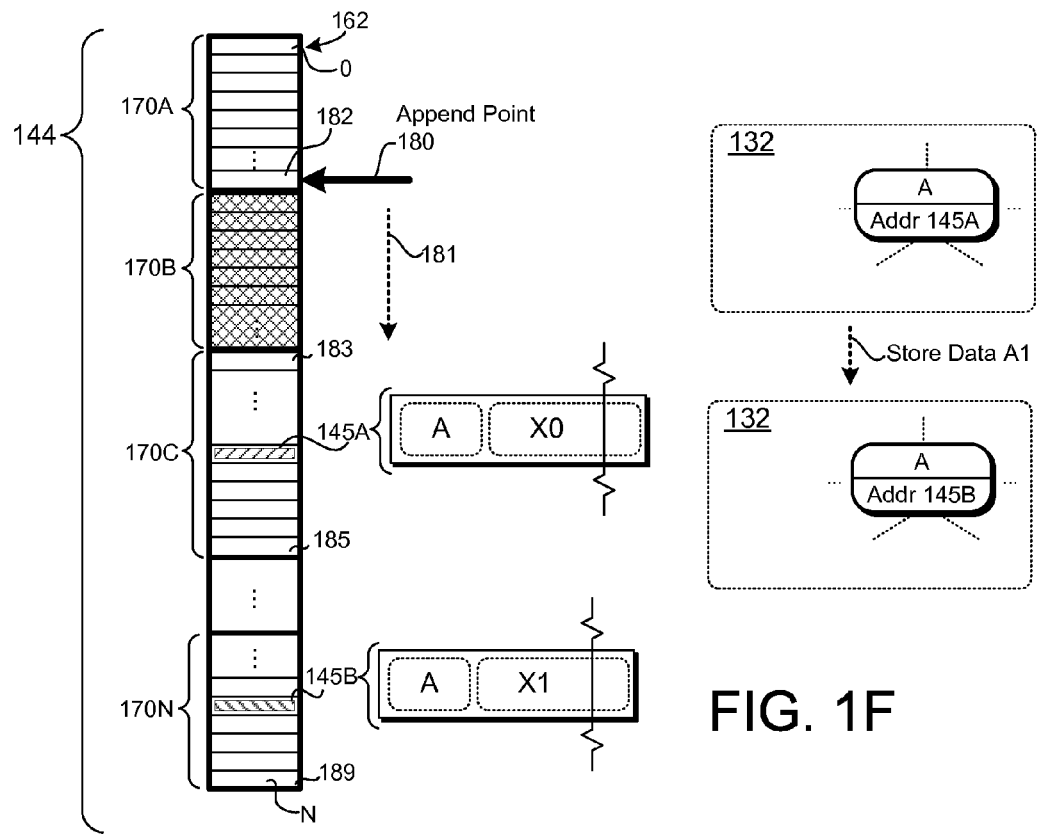
FIG. 1F depicts embodiments of a storage log and storage metadata.

FIG. 1F depicts one embodiment of append-only storage operations performed within the storage address space 144 of the storage medium 140. As disclosed above, the storage address space 144 comprises a plurality of storage divisions 170A-N (e.g., erase blocks, logical erase blocks, or the like), each of which can be initialized for use in storing data (e.g., erased). The storage divisions 170A-N may comprise respective storage units 145, which may correspond to pages of one or more solid-state storage elements 152A-Y, logical pages, offsets, and/or the like, as disclosed herein. The storage units 145 may be assigned respective storage addresses (e.g., storage address 0 through storage address N).

The log storage module 136 may be configured to store data sequentially from an append point 180 within the physical address space 144 (by use of the storage controller 129). In the FIG. 1F embodiment, data may be appended at the append point 180 within storage location 182 of storage division 170A and, when the storage location 182 is filled, the append point 180 may advance 181 to a next available storage location. As used herein, an "available" storage location refers to a storage location that has been initialized and has not yet been programmed (e.g., has been erased). As disclosed above, some types of storage media can be reliably programmed only once after erasure. Accordingly, an available storage location may refer to a storage location within a storage division 170A-N that is in an initialized (or erased) state.

In the FIG. 1F embodiment, the storage division 170B may be unavailable for storage due to, inter alia, not being in an erased state (e.g., comprising valid data), being out-of-service due to high error rates, or the like. Therefore, after filling the storage location 182, the log storage module 136 may skip the unavailable storage division 170B, and advance the append point 180 to the next available storage division 170C. The log storage module 136 may be configured to continue appending data within storage units 183-185, at which point the append point 180 continues at a next available storage division 170A-N, as disclosed above.

After storing data on the "last" storage location within the storage address space 144 (e.g., storage location N 189 of storage division 170N), the log storage module 136 may advance the append point 180 by wrapping back to the first storage division 170A (or the next available storage division, if storage division 170A is unavailable). Accordingly, the log storage module 136 may treat the storage address space 144 as a loop or cycle.

As disclosed above, sequentially appending data within the storage address space 144 may generate a storage log on the storage medium 140. In the FIG. 1F embodiment, the storage log may comprise the ordered sequence of storage operations performed by sequentially storing data packets (and/or other data structures) from the append point 180 within the storage address space 144. The append-only storage format may be used to modify and/or overwrite data out-of-place. Performing storage operations out-of-place may avoid write amplification, since existing valid data on the storage divisions 170A-N comprising the data that is being modified and/or overwritten need not be immediately erased (and other valid data in the storage division 170A-N need not be relocated/rewritten). Therefore, writing data out-of-place may remove erasure from the latency path of many storage operations (the erasure latency is no longer part of the "critical path" of a write operation).

In the FIG. 1F embodiment, a client 106 may write data X0 to LID A (e.g., by issuing a write request through the storage interface 121). In response, the storage module 120 may a) write the data X0 to storage unit 145 on the storage medium 140 (by use of the log storage module 136 and/or storage controller 129) and b) assign LID A to the storage location 145A in the forward map 132. The data segment X0 may be stored in the self-describing data packet format 110, as disclosed above. The data segment 112 of the packet 110 may comprise the data segment X0, and the persistent metadata 114 may comprise the LID(s) associated with the data segment (e.g., the LID A). Moreover, the data segment X0 may be appended sequentially within the storage address space 144 (in storage division 170C), such that a relative log order of the data packet 110 may be determined (e.g., based on the relative offset of the data packet 110 within the storage division 170C and/or the sequence information 113 associated with the storage division 170C).

The client 106 may request an operation to modify and/or overwrite the LID A with data X1, which may comprise replacing the data segment X0 with data segment X1. The storage module 120 may service the request by writing the data segment X1 out-of-place, which may comprise a) appending a new data packet 110 comprising the data segment X1 at a different storage unit 145B, rather than modifying the existing data packet 110, in place, at storage location 145A, and b) updating the metadata 130 (forward map 132) to assign LID A to storage location 145B and/or to invalidate the obsolete data segment X0 stored at storage location 145A. As illustrated in FIG. 1F, updating the forward map 132 may comprise updating an entry corresponding to LID A to assign LID A to the storage address of storage unit 145B comprising the data segment X1.

Performing storage operations out-of-place (and deferring storage division 170A-N erasure), may cause invalid data to accumulate within the storage medium 140. In the FIG. 1F embodiment, the storage module 120 overwrites LID A by appending the data segment X1 to the storage log as opposed to overwriting and/or replacing the data segment X0 "in place" at storage location 145A. As such, the obsolete version of LID A (data segment X0) remains on the storage medium 140. The obsolete version of the data segment X0 may not be immediately removed or erased from the storage medium 140, because, as disclosed above, erasing the data segment X0 may involve erasing an entire storage division 170A and/or relocating valid data on the storage division 170A, which is a time-consuming operation and can result in write amplification. Similarly, data that is no longer is use (e.g., deleted or subject to a deallocation or TRIM operation) may not be immediately removed. As such, over time, the storage medium 140 may accumulate "invalid" data.

The storage module 120 may identify invalid data, such as the data segment X0 at storage location 145A, by use of the metadata 130 (e.g., the forward map 132). The storage module 120 may determine that storage units 145 that are not assigned to LIDs of the logical address space in the forward map 132 comprise data that does not need to be retained on the storage medium 140. Alternatively, or in addition, the storage module 120 may maintain other metadata 130, such as validity bitmaps, reverse maps, and/or the like, to efficiently identify data that has been deleted, has been TRIMed, is obsolete, and/or is otherwise invalid.

The log storage module 136 may be configured to reclaim storage resources occupied by invalid data. The log storage module 136 may be further configured to perform other media management operations (e.g., grooming operations), which may include, but are not limited to: reclaiming storage resources, refreshing data stored on the storage medium 140 (to prevent error conditions due to data degradation, write disturb, read disturb, and/or the like), monitoring media reliability conditions, wear leveling, and/or the like. As used herein, reclaiming a storage resource, such as a storage division 170A-N, refers to erasing the storage division 170A-N so that new data may be stored/programmed thereon. Reclaiming a storage division 170A-N may comprise relocating valid data on the storage division 170A-N to a new storage location. The storage module 120 may identify storage divisions 170A-N for reclamation based upon one or more factors, which may include, but are not limited to, the amount of invalid data in the storage division 170A-N, the amount of valid data in the storage division 170A-N, wear levels (e.g., number of program/erase cycles), time since the storage division 170A-N was programmed or refreshed, and so on.

As disclosed above, portions of the metadata 130 may be stored in volatile memory resources 103 of the computing system 100 and, as such, may be subject to loss and/or corruption. The metadata management module 126 may be configured to reconstruct portions of the metadata 130 from the storage log maintained on the storage medium 140. In the FIG. 1F embodiment, the current version of the data associated with LID A may be determined based on the relative log order of the data packets 110 stored within storage units 145A and 145B, respectively. Since the data packet 110 at storage location 145B is ordered after the data packet at storage location 145A in the storage log, the metadata management module 126 may determine that storage location 145B comprises the most recent, up-to-date version of the data corresponding to LID A (and that the data at storage unit 145A is invalid). The storage module 120 may reconstruct the forward map 160 to associate the LID A with the data packet 110 at storage location 145B (rather than the obsolete data at storage location 145A).

As disclosed above, in some embodiments, the log storage module 136 may be configured to append data packets 110 within large, logical storage units, such as logical pages (e.g., groups of media storage locations on respective solid-state storage elements 152A-Y). Logical pages within the storage array 150 may be formed by aggregating multiple solid-state storage elements 152A-Y of the array (e.g., communicatively coupling the solid-state storage elements 152A-Y in parallel using, inter alia, the interconnect 127). The storage controller 129 may be configured to perform data storage operations on logical pages that span multiple solid-state storage elements 152A-Y in order to, inter alia, manage the asymmetric properties of the storage medium 140 (e.g., it make take significantly longer to program data to the solid-state storage elements 152A-Y than to read data therefrom). The physical storage capacity of the logical pages managed by the storage controller 129 may be determined by, inter alia, the configuration of the solid-state storage elements 152A-Y comprising the storage array 150. In one embodiment, the storage array 150 comprises 24 solid-state storage elements 152A-Y for data storage, each of which comprises 2 kb physical storage blocks (physical pages). Therefore, each logical page of the storage array 115 may comprise 48 kb of physical storage capacity. The physical storage capacity of the logical pages managed by the storage controller 129 may be larger than the data packets 110 stored therein (e.g., each logical page may be capable of storing multiple data packets 110). Accordingly, the address of a data packet 110 (e.g., a storage unit 145) may correspond to the address of the logical page comprising the data packet 110 and an offset of the data packet 110 within the logical page.

In some embodiments, the storage module 120 is configured to adjust the size and/or configuration of the data packets 110 appended to the storage log. The storage module 120 may, for example, configure the size of the data segments 112 of the data packets 110, resulting in corresponding changes to the block size of the logical address space 122. The storage module 120 may, for example, configure the log storage module 136 to implement data packets 110 that comprise 1 kb data segments 112 (rather than data segments 112 of 512 bytes), which results in changing the granularity of storage operations performed by the storage module 120 from 512 bytes to 1 kb blocks (e.g., the LIDs of the logical address space 122 represent 1 kb storage blocks rather than 512-byte storage blocks). Further embodiments of systems and methods for storing data packets 110 within a storage array are disclosed in U.S. patent application Ser. No. 13/784,705 entitled, "Systems and Methods for Adaptive Data Storage," filed Mar. 4, 2013 for David Flynn et al., which is incorporated by reference above.

As disclosed above, the storage module 120 may provide an independent mapping layer between clients 106 and physical storage resources of the storage device 141. The storage module 120 may, for example, provide for reserving LIDs of the logical address space 122, such that the corresponding physical storage capacity represented by the LIDs is not consumed until data is written to the LIDs. The physical storage resources occupied by a particular set, range, and/or extent of LIDs may, therefore, correspond to bindings between the LIDs and storage units 145 on the storage medium 140, as opposed to the physical storage capacity represented by the LIDs. The storage module 120 may leverage the independent mapping layer between the logical address space 122 and physical storage resources to efficiently interoperate with clients 106.

Figure 2A:
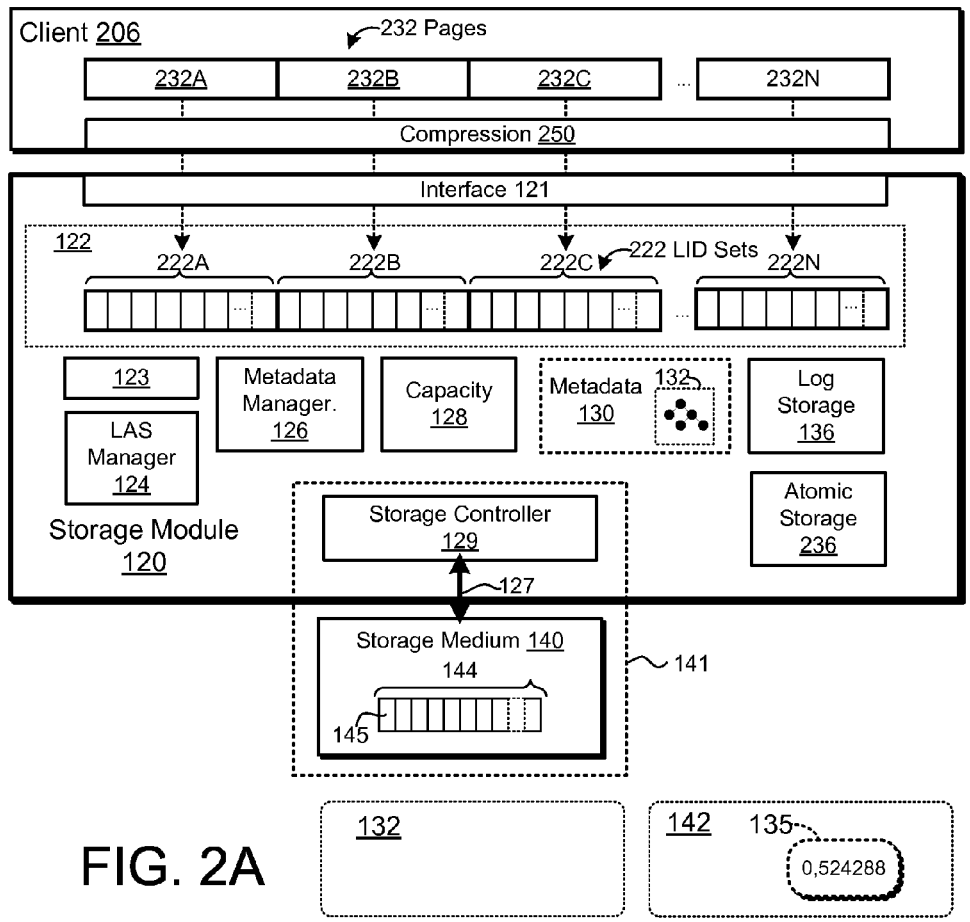
FIG. 2A is a block diagram depicting further embodiments of a computing system comprising a storage module to manage storage compression operations.

FIG. 2A depicts one embodiment of a storage module 120 that efficiently incorporates compression functionality of a client 206 by use of, inter alia, the LAS management module 124. As disclosed above, "compression," as used herein, refers to reducing the size of a set of data (e.g., generating a smaller output data set from an input data set). Compression may include, but is not limited to: data compression, source coding, lossless data compression, lossy data compression, encryption, decryption, data de-duplication, data cloning, data differencing processing, and/or the like.

The client 206 may be configured to perform storage operations on pages 232. As disclosed above, a "page" refers to a logical construct that represents, corresponds to, and/or signifies a quantum of data (e.g., a particular amount of storage capacity). Pages 232 may, for example, be defined to represent 16 kb of data. Pages 232 may comprise and/or correspond to a plurality of blocks (e.g., LIDs of a logical address space 122). The disclosure is not limited in this regard, however, and could include pages 232 of different sizes and/or variably sized pages (e.g., pages 232 that represent different amounts of storage capacity and/or comprising different numbers of blocks and/or variably sized blocks). The client 206 may be configured to perform I/O operations on pages 232, which may include, but are not limited to: writing pages 232, reading pages 232, modifying pages 232, deallocating pages 232, and so on. The pages 232 may correspond to data of the client 206, which may include, but is not limited to: objects, entities, storage entities, data structures, files, file collections, file system metadata and/or objects (e.g., file metadata, directories, inodes, device nodes, sockets, pipes, file streams, file tables, file indexes, and the like), database information (e.g., database primitives, database objects, tables, values, elements, attributes, and the like), data streams, and/or the like.

The size of the pages 232 may be larger than the size of the underlying blocks of the storage module 120 (e.g., larger than the capacity of the storage units 145 and/or corresponding LIDs of the logical address space 122). As disclosed above, a "block size" refers to the granularity of storage operations corresponding to a particular identifier (LID), storage unit 145, page, sector, block, data packet 110, and/or the like. The block size of the storage module 120 may correspond to the amount of storage capacity represented by the LIDs of the logical address space 122, which may be smaller than the size of the pages 232. Due to, inter alia, the mismatch between the size of the pages 232 and the block size of the storage module 120, each page 232 may comprise and/or correspond to two or more LIDs (e.g., two or more blocks, storage units 145, and/or data packets 110 on the storage medium 140). In the FIG. 2A embodiment, the pages 232 correspond to respective LID ranges (LID sets 222). The disclosure is not limited in this regard, however, and could be adapted to associate pages 232 with LIDs of the logical address space 122 using any suitable mechanism and/or technique. The pages 232 may have a common fixed size, as illustrated in FIG. 2A, or may be variably sized (e.g., comprise and/or correspond to different amounts of storage capacity and/or blocks).

The ratio between pages 232 and LIDs (e.g., the number of LIDs in each LID set 222) may correspond to the ratio between the size of the pages 232 and the storage capacity represented by the LIDs (e.g., the ratio of page size to the block size of the storage module 120). In the FIG. 2A embodiment, the pages 232 represent 16 kb of storage capacity, and the LIDs correspond to 512-byte blocks (e.g., storage units 145 and/or data segments 112 capable of storing 512 bytes of data). Accordingly, the ratio between pages 232 and LIDs is 1:32, such a page 232 corresponds to a LID set 222 comprising 32 LIDs. The LID set 222A may comprise LIDs 0-31, the LID set 222B may comprise LIDs 32-63, the LID set 222C may comprise LIDs 64-95, and so on. In other embodiments, pages may have different, variable sizes and, as such, may corresponding to different sets and/or numbers of LIDs.

The client 106 may reserve a range of LIDs for use by the pages 232A-N through the interface 121 (and by use of the LAS management module 124). Reserving the LIDs may comprise creating the reservation entry 135 in a reservation map 142. Alternatively, or in addition, reservation metadata, such as the reservation entry 135, may be maintained in the forward map 132, as disclosed above. In the FIG. 2A embodiment, the client 206 has reserved 524288 LIDs (from LID 0 to 524287), which may correspond to 16384 pages 232. The reservation entry 135 may not correspond to and/or consume physical storage resources on the storage medium 140. As disclosed above, the LIDs 0-524287 may not consume physical storage capacity until the client 206 writes data thereto (through requests to write one or more of the pages 232A-N). Although FIG. 2A depicts a LID reservation, the disclosure is not limited in this regard. In some embodiments, the client 206 may define the pages 232 and perform storage operations therein without reserving the corresponding LIDs. The client 206 may, for example, allocate and/or reserve LIDs for the pages 232 as needed and/or as storage operations are requested for respective pages 232A-N.

Figure 2B:
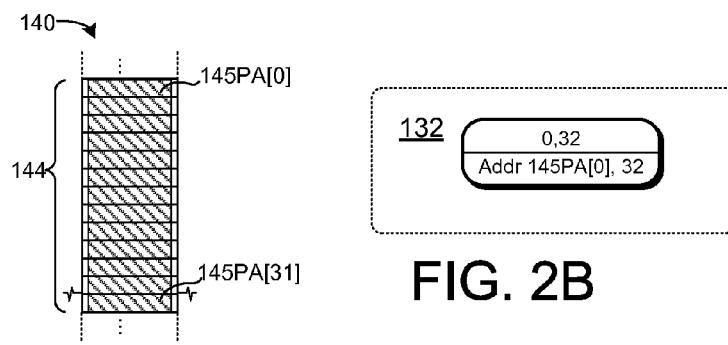
FIG. 2B depicts embodiments of a page write operation.

The client 206 may write a page 232 by issuing a write request to the storage module 120 (through the interface 121). The write request may comprise and/or reference the LIDs corresponding to the page 232. In response, the storage module 120 may a) write data of the page 232 on storage units 145 of the storage medium 140 (e.g., append the data to the storage log, as disclosed above), and b) bind the data of the page 232 to the corresponding LIDs (e.g., using the forward map 132). FIG. 2B illustrates the storage module 120 servicing a request to store data P0 to page 232A. The data P0 may comprise a 16 kb data segment. Writing the page 232A may comprise a) writing the data P0 on respective storage units 145 of the storage medium 140, and b) mapping the LIDs of the page 232A (LIDs 0-31) to the stored data by use of the forward map 132. The data P0 may be written by storing data within a plurality of storage units 145PA[0]-145PA[31] within the storage address space 144 of the storage medium 140. The storage units 145PA[0]-145PA[31] may correspond to respective blocks, sectors, pages, and/or other storage locations on the storage medium 140. In some embodiments, the storage units 145PA[0]-145PA[31] comprise data packets 110 stored at respective offsets within one or more logical pages (e.g., rows 154 of a storage array 150). Although FIG. 2B depicts the storage units 145PA[0]-145PA[31] stored contiguously within the storage address space 144, the disclosure is not limited in this regard; in some embodiments, data of the page 232A may be interleaved with data of other pages 232B-N and/or data of other clients 106 within the storage address space 144.

The capacity module 128 may determine that the page 232A consumes 16 kb of data on the storage medium 140 based on, inter alia, the mappings between LIDs 0-31 and storage units 145PA[0]-145PA[31] in the forward map 132.

Referring to FIG. 2A, the client 206 may comprise and/or be communicatively coupled to a client compression module 250 that manages, inter alia, data compression and/or decompression operations for the client 206. As disclosed above, "data compression," as used herein, refers to any data processing technique that reduces the size of a data set (e.g., reduces the size of a page 232), which may include, but not limited to: data compression, source coding, lossless data compression, lossy data compression, encryption, decryption, data de-duplication, data cloning, data differencing processing, and/or the like. The client compression module 250 may be implemented as an add-on, an extension, a library, and/or a plug-in to the client 206. Accordingly, in some embodiments, the compression module 250 may extend and/or replace I/O functionality of the client 206. Alternatively, or in addition, portions of the compression module 250 may be incorporated into the client 206 (e.g., the compression module 250 may be implemented as an integral component and/or library of the client 206).

Figure 2C:
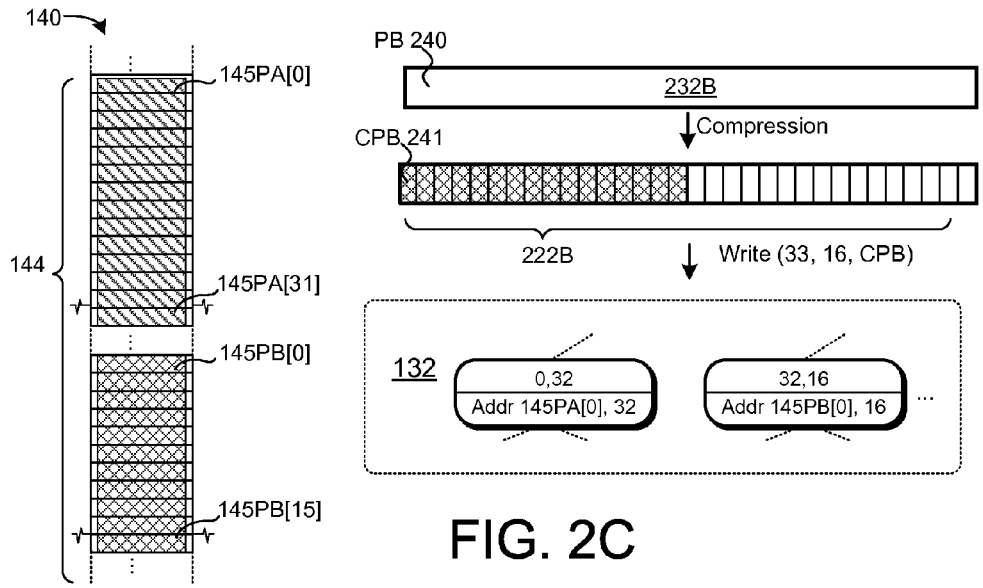
FIG. 2C depicts embodiments of operations to manage storage compression.

The compression module 250 may compress data before the data is written to the storage module 120 (and decompress compressed data read from the storage module 120). FIG. 2C illustrates another embodiment of a client 206 that includes a compression module 250 to perform operations to write compressed data of a page 232B. In the FIG. 2C embodiment, the page 232B comprises 16 kb of uncompressed data PB 240. Accordingly, the page 232B may represent 32 storage units 145 on the storage device (e.g., represent the physical storage capacity of 32 LIDs, blocks, sectors, and/or the like). As disclosed above, the page 232B may correspond to LID set 222B comprising 32 LIDs (LIDs 32-63). The client 206 may be configured to compress the data PB 240, by use of the compression module 250. In the FIG. 2C embodiment, the compression module 250 compresses the 16 kb of uncompressed data PB 240 into 8 kb of compressed data CPB 241, which can be stored in a fewer number of blocks (storage units 145) than the uncompressed data (e.g., can be stored in 16 LIDs rather than 32 LIDs). The compression module 250 may issue a request to write the compressed data CPB 241 to the storage module 120 (through the interface 121). The request may correspond to a subset of the LIDs in the LID set 222 (e.g., may write data to the first 16 LIDs in the LID set 222 rather than the full set of 32 LIDs). In response, the storage module 120 writes the compressed data CPB 241 to storage medium 140 by a) writing the compressed data to respective storage units 145PB[0]-145PB[15], as disclosed above, and b) mapping the storage units 145PB[0]-145PB[15] to LIDs 32-47. The LIDs 48-63 of LID set 222B may remain unmapped. The page 232B may, therefore, represent 16 kb of storage capacity (32 blocks or LIDs of the storage module 120), but may consume only the equivalent of 16 blocks or LIDs on the storage medium 140.

The client 206 may read data of the page 232B by issuing a request to read the LIDs corresponding to the page (e.g., LIDs 32-63). In response, the storage module 120 may determine that only LIDs 32-47 in the LID set 222 comprise valid data (by use of the forward map 132), and may return the compressed data CPB 241 stored on storage units 145PB[0]-145PB[15]. The compression module 250 of the client 206 may be configured to decompress the compressed data CPB 241 and provide the corresponding uncompressed data PB 240 to the client 206. Alternatively, the compression module 250 of the client 206 may maintain metadata (not shown) pertaining to the size of the compressed data CPB 241 (and/or the number of LIDs occupied by the compressed data CPB 241), and may be configured to read the page 232B by issuing a request to read the subset of the LID set 222B (LIDs 32-47) as opposed to the full LID set 222B.

In some embodiments, writing the compressed data CPB 241 further comprises deallocating unused LIDs. As used herein, an unused LID refers to a LID that is not associated with data stored on the storage medium 140 (e.g., a LID that is empty, unmapped, un-needed, and/or the like). In the FIG. 2C embodiment, writing the compressed data CPB 241 may comprise a) issuing the request to write the compressed data CPB 241 to a subset of the LIDs of the page 232B (LIDs 32-47), and b) sending a message to the storage module 120 that identifies the LIDs of the page 232B that are not in use (e.g., LIDs 48-63). The message may comprise one or more of a TRIM message, a TRIM directive (a persistent TRIM message), an unmap message, a deallocation message, and/or the like. In response, the storage module 120 may remove the corresponding LIDs from the forward map 132.

Figure 2D:
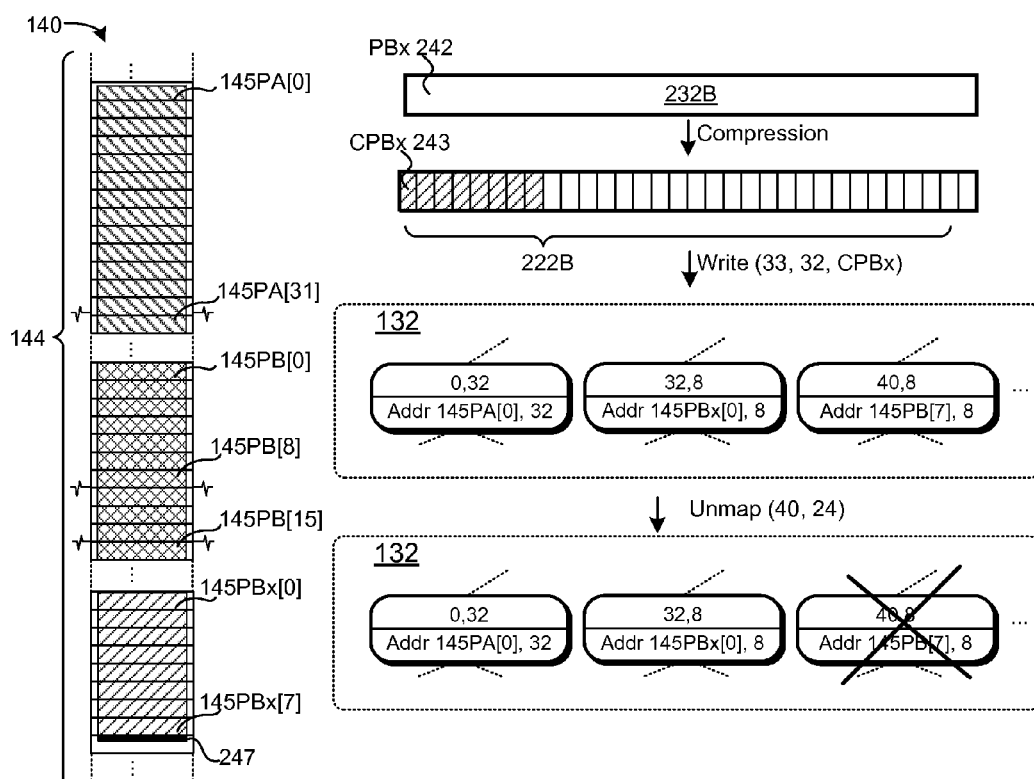
FIG. 2D depicts further embodiments of operations to manage storage compression.

FIG. 2D depicts further embodiments of operations to manage storage compression operations. In the FIG. 2D embodiment, the client 206 issues a request to modify and/or overwrite the page 232B with uncompressed data PBx 242. Writing the page 232B may comprise a) compressing the uncompressed data PBx 242 into compressed data CPBx 243 and b) issuing a request to write the compressed data CPBx 243 to the storage module 120. In the FIG. 2D embodiment, the page 232B is compressed into 4 kb (eight blocks, or LIDs), such that the compressed data CPBx 243 is smaller than the compressed data CPB 241 previously written to the page 232B. The write request may indicate the size of the compressed data CPBx 241 (e.g., may indicate that the compressed data corresponds to eight LIDs in the LID set 222B). Alternatively, and as illustrated in FIG. 2D, the write request may correspond to the full LID set 222B (LIDs 33-63), and the storage module 120 may determine the actual size of the compressed data CPBx 243 based on the data corresponding to the write request (e.g., based on the size of the write buffer associated with the request request).

Servicing the write request may comprise overwriting the existing LIDs 32-39 bound to storage units 145PB[0]-145PB[7] out-of-place, by a) writing the compressed data PBx 243 to storage units 145PBx[0]-145PBx[7], and b) assigning the LIDs 32-39 to the storage units 145PBx[0]-145PBx[7] in the forward map 132. After completing the request to write the compressed data CPBx 243, the storage module 120 may return a completion acknowledgement to the client 206 (and/or storage module). The capacity module 128 may determine that the physical storage capacity consumed by the page 232B corresponds to eight blocks (4 kb) rather than the full 16 kb represented by the page 232B and/or the 16 blocks (8 kb) consumed by the previous version of the page 232B (compressed data CPB 241).

As illustrated in FIG. 2D, the compressed data CPBx 243 occupies fewer blocks (fewer LIDs) than the obsolete version of the data (compressed data CPB 241). Accordingly, the operation to write CPBx 243 to page 232B may not replace all of the mappings to obsolete data of the page 232B; mappings between LIDs 40-47 and compressed data CPB 241 stored in storage units 145B[8]-145B[15] may remain in the forward map 132. The compression module 250 may be configured to issue a message to the storage module 120 that identifies the LIDs of the page 232B that are not in use to reference compressed data CPBx 243 of the page 232B. In the FIG. 2D embodiment, the compression module 250 issues an unmap message to the storage module 120. In response, the storage module 120 removes the LIDs specified in the unmap message from the forward map 132 (e.g., removes entries corresponding to LIDs 40-47). The message issued by the compression module 250 may identify the LIDs that were in use in one or more previous versions of the page 232B (e.g., indicate that LIDs 40-47 are no longer in use) or, as depicted in FIG. 2B, may identify all of the LIDs in the LID set 222B that are not in use (e.g., indicate that LIDs 40-63 are not in use).

The storage module 120 may be further configured to store persistent deallocation metadata 247 on the storage medium 247 to identify the LIDs that are not in use. The persistent deallocation metadata 247 may be configured to preserve the state of the forward map 132, such that the unmap operation is persistent and crash save.

As disclosed above, the storage module 120 may be configured to associate data with persistent metadata 114, which may include, inter alia, the LID bound to the data (e.g., the persistent metadata 114 may comprise the LID of the data segment 112 of a data packet 110). The LAS management module 124 may be configured to reconstruct the metadata 130 (e.g., the forward map 132) by use of the persistent metadata 114 stored on the storage medium 140. Reconstructing the forward map 132 may, therefore, comprise accessing data packets 110 in the storage log on the storage device 141, and reconstructing entries 134 of the forward map 132 by use of the persistent metadata 114 of the accessed data packets 110. Referring to FIG. 2D, reconstructing the forward map 132 may comprise accessing data packets 110 on storage units 145PA[0]-145PA[31] to reconstruct the mappings between LIDs 0-31 and the data of page 232A. Reconstructing the forward map 132 may further comprise accessing the data packets 110 on storage units 145PB[0]-145PB[15] and 145PBx[0]-145PBx[7]. The mappings between LIDs 32-39 and the compressed data CPBx (storage units 145PBx[0]-145PBx[7]) may replace (and/or obviate) the mappings between LIDs 32-39 and the previous version of compressed data PB stored on storage units 145PB[0]-145PB[7]. The storage units 145PB[8]-145PB[15] may, however, comprise mappings between LIDs 40-47 and CPB 241. Due to the smaller size of data CPBx 243 relative to CPB 241, these mappings were not replaced and/or overridden by the operation to write CPBx 243. The persistent deallocation metadata 247 may identify the LIDs of the page 232B that are not in use, so that the forward map 132 can be accurately reconstructed (e.g., remove mappings between LIDs in the LID set 222B and the obsolete data of page 232B). The persistent deallocation metadata 247 may be stored in one or more of the data packets 110 comprising CPBx 243 (e.g., the data packets on storage units 145PBx[0]-145PBx[07]) and/or may be stored as a separate entry in the storage log (e.g., as a separate persistent note within the storage log). Further embodiments of systems and methods for persistent, crash save metadata are disclosed in U.S. patent application Ser. No. 13/566,471, entitled "Apparatus, System, and Method for Persistent Deallocation," filed Aug. 3, 2012 for David Flynn et al., and U.S. Provisional Patent Application Ser. No. 61/872,186, entitled "Systems and Methods for Storage Metadata Management," filed Aug. 30, 2013, for Nisha Talagala, et al., each of which is hereby incorporated by reference in its entirety.

As illustrated in FIGS. 2A-2D, servicing requests to write blocks, segments, and/or sectors (e.g., pages 232) that are larger than the underlying block size of the storage module 120 may comprise writing data to a plurality of different storage units 145, which, as disclosed above, may span multiple storage divisions, logical pages, storage arrays 150A-N, banks 158A-N, and/or the like. The storage module 120 may be configured to service such requests as atomic storage operations. As used herein, an atomic storage operation refers to a storage operation that is either fully completed in its entirety or rolled back. Accordingly, atomic storage operations may not be partially completed; the storage module 120 may be configured to invalidate and/or remove data of incomplete atomic storage operations. Referring to FIG. 2A, the storage module 120 may comprise an atomic storage module 236 configured to append data packets 110 corresponding to larger data blocks (e.g., pages 232), such that either: a) all of the data packets 110 are successfully written to the storage medium 140; or b) data packets 110 pertaining to partial, failed atomic storage operations can be identified and invalidated. Embodiments of systems, methods, and/or apparatus for atomic storage operations are disclosed in U.S. patent application Ser. No. 13/424,333, entitled "Logical Interfaces for Contextual Storage," filed Mar. 19, 2012 for David Flynn et al.; U.S. Provisional Patent Application No. 61/454,235, entitled "Virtual Storage Layer Supporting Operations Ordering, a Virtual Address Space, Atomic Operations, and Metadata Discovery," filed Mar. 18, 2011; U.S. Provisional Patent Application No. 61/625,647, entitled "Systems, Methods, and Interfaces for Managing a Logical Address Space," filed Apr. 17, 2012, for David Flynn et al.; U.S. Provisional Patent Application No. 61/637, 165, entitled "Systems, Methods, and Interfaces for Managing a Logical Address Space," filed Apr. 23, 2012, for David Flynn et al.; U.S. Provisional Patent Application No. 61/861,314 filed Aug. 1, 2013 for Nisha Talagala et al.; and U.S. Provisional Patent Application No. 61/892,962, entitled "Systems and Methods for Distributed Atomic Storage Operations," filed Oct. 18, 2013 for Nisha Talagala et al., each of which is hereby incorporated by reference in its entirety.

Figure 3A:
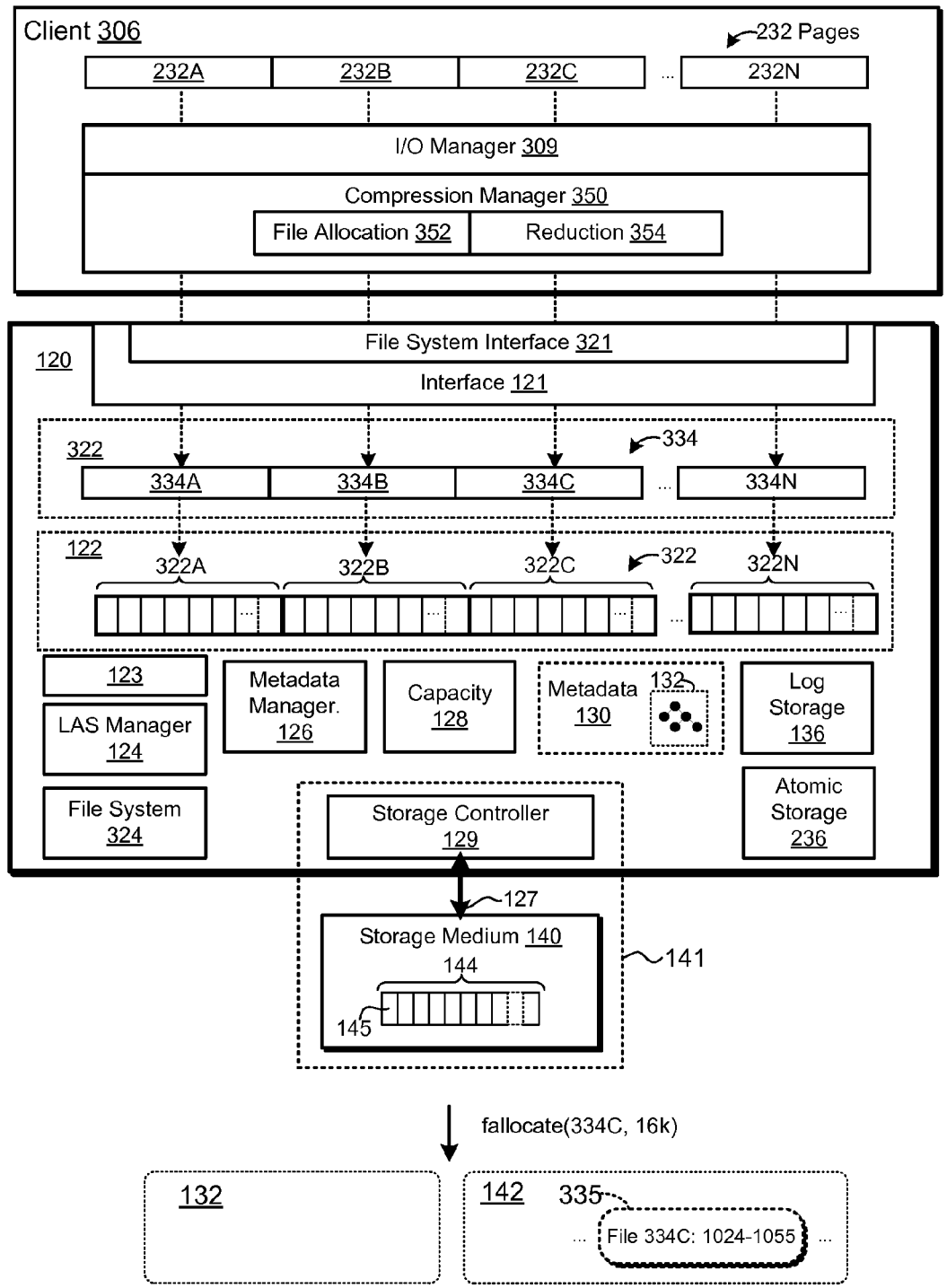
FIG. 3A is a block diagram depicting further embodiments of a computing system comprising a storage module to manage storage compression operations.

FIG. 3A depicts further embodiments of a storage module 120 that efficiently incorporates compression functionality of a client 306. In the FIG. 3A embodiment, the storage module 120 comprises a file system module 324 and file system interface 321. The file system module 324 provides file system functionality, which may include, but is not limited to: allocating files 334, performing I/O operations pertaining to the files 334, managing metadata 130 to map files 334 to LIDs of the logical address space 122 (e.g., file LIDs 322), and so on. Further embodiments are disclosed in U.S. patent application Ser. No. 12/986,117 entitled "Apparatus, System for a Storage Layer," filed Jan. 6, 2011 for David Flynn et al., and U.S. patent application Ser. No. 13/865,153 entitled "Systems and Methods for Storage Allocation," filed Apr. 17, 2013 for David Flynn et al., each of which are hereby incorporated by reference in their entirety.

The client 306 may be configured to implement I/O operations on pages 232, which may correspond to and/or represent a particular amount of storage capacity (e.g., a particular number of blocks), as disclosed above. In the FIG. 3A embodiment, the pages may represent 16 kb of storage capacity, which may correspond to 32 storage blocks (32 LIDs) of the storage module 120.

A compression manager 350 manages compression operations for the client 306 (e.g., manages compression and/or decompression of pages 232 for storage on the storage device 141). As disclosed above, the compression manager 350 may be implemented as an add-on, an extension, a library, and/or a plug-in to the client 306. Accordingly, in some embodiments, the compression manager 350 may extend and/or replace I/O functionality of the client 306. In some embodiments, the compression manager 350 is embodied as an extension to an I/O manager 309 of the client 306. Alternatively, or in addition, portions of the compression manager 350 may be implemented as an integral component and/or library of the I/O manager 309.

The I/O manager 309 may be configured to service I/O requests pertaining to the pages 232 by use of, inter alia, the file system interface 321 of the storage module 120. Servicing an I/O request pertaining to the pages 232 of the client 306 may, therefore, comprise performing corresponding I/O operations on files 334 managed by the storage module 120: operations to allocate pages 232 may comprise allocating files 334 through the file system interface 321 (e.g., using fallocate calls, and/or the like); writing pages 232 may comprise writing files 334 (e.g., using fwrite calls, and/or the like); reading pages 232 may comprise reading files 334 (e.g., fread calls, and/or the like), and so on. The compression manager 350 may be configured to extend and/or replace file I/O operations in order to reduce the size of the pages 232 for storage on the storage device 241. In one embodiment, an operation to write a particular page 232C comprises a) allocating a file 334C for the page 232C (if a corresponding file 334C does not exist) by use of a file allocation module 352, and b) generating a reduced-size data set corresponding to the page 232C by use of a reduction module 354, and c) writing the reduced-size data set to the file 334C. The file allocation module 352 may be further configured to d) identify unused portions of the page 232C and/or file 334C through, inter alia, the file system interface 321. In some embodiments, the reduction module 354 is configured to compress pages 232 using a compression algorithm implemented by the compression manager 350 (e.g., Iz77, Iz78, or the like). Alternatively, or in addition, the reduction module 352 may generate the reduced-size data set by use of an external compression module, engine, library, or the like, such as compression functionality implemented by an operating system (e.g., zlib), file system, and/or the like. Alternatively, or in addition, the reduction module 354 may generate the reduced-size data set by one or more of: encrypting data of the pages 232, decrypting data of the pages 232, de-duplicating data of the pages 232, cloning data of the pages 232, and/or any other suitable mechanism(s) for generating reduced-size data set(s).

As disclosed above, the compression manager 350 may comprise a file allocation module 352 that manages allocation (and deallocation) of files 334 corresponding to the pages 232 of the client 306. The file allocation module 352 may allocate files 334 for the pages 232 by, inter alia, issuing file allocation requests to the storage module 120 (e.g., through the file system interface 321). The file allocation module 352 may request allocation of "thinly provisioned" files that represent storage capacity equivalent to the storage capacity represented by the pages 232. As used herein, a "thinly provisioned" file 334 refers to a file 334 that represents a particular storage capacity and/or size, but does not consume the corresponding physical storage resources until data is written to the file 334. As illustrated in FIG. 3A, a request to allocate the file 334C for page 232C may comprise issuing a request to allocate a 16 kb file by, inter alia, issuing an fallocate request to create a 16 kb file (e.g., fallocate (334C, 0, 16 kb)). In response to the request, the storage module 120 creates a reservation entry 335 for the file 334C (in the reservation index 142, and/or other metadata 130) by use of, inter alia, the file system module 324 and/or LAS management module 124. As illustrated in FIG.

3A, since the page 232C and file 334C represent 16 kb of storage capacity, the file 334C may correspond to 32 storage blocks (e.g., 32 LIDs 1024-1055). The file system module 324 may manage a translation layer to map files 334 to corresponding sets of file LIDs 322. The LIDs 322C reserved for the file 334C may be selected from any suitable portion of the logical address space 122 and may comprise one or more sets, groups, and/or ranges of LIDs. The reservation entry 335 created for the file 334C may not be mapped to data stored on the storage medium 140 and, as such, does not represent usage of physical storage resources. As illustrated in FIG. 3A, the reservation entry 335 may associate the LIDs 1024-1055 with the file 334C. Alternatively, the file 334C may be associated with the LIDs 1024-1055 in a separate mapping structure of the metadata 130.

Figure 3B:
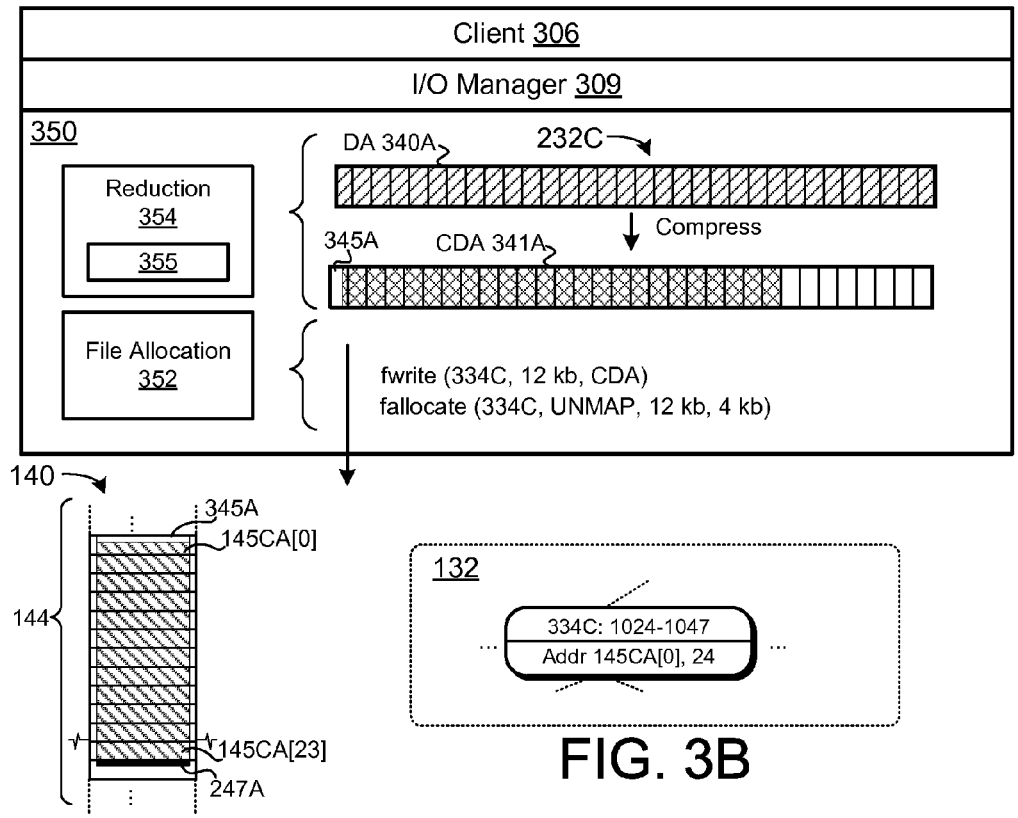
FIG. 3B depicts further embodiments of operations to manage storage compression.

FIG. 3B depicts operations to write compressed data to a page 232 of the client 306. In the FIG. 3B embodiment, the client 306 issues a request to write page 232C. The request may be issued through and/or by use of the I/O manager 309 of the client 306, which may be configured to service the request by use of the compression manager 350. In response to the request, the file allocation module 352 may determine whether a corresponding file 334C has been created and, if not, may issue a request to create the file 334C, as disclosed above. In some embodiments, the reduction module 354 compresses data of the page (DA 340A) using, inter alia, a compression module 355, which may include, but is not limited to: an internal compression engine, library, and/or module; an external compression engine, library, and/or module, and/or the like. In some embodiments, the reduction module 354 includes other module(s) for generating reduced-size data sets which may include, but are not limited to: a de-duplication module, a clone module, an encryption module, a decryption module, and/or the like.

In the FIG. 3B embodiment, the 16 kb of data DA 340A is compressed into 12 kb of data CDA 341A. The file allocation module 352 may be configured to write the compressed data CDA 341A to the file 334C corresponding to the page 232C by, inter alia, issuing a file write request to the storage module 120 (e.g., generating an fwrite request to write 12 kb of compressed data CDA 341A to file 334C). The fwrite request may be further configured to request that the write operation be performed as an atomic storage operation (e.g., by use of an ioctl command), as disclosed above. The file allocation module 352 may be further configured to identify the unused and/or empty portion(s) of the file 334C by, inter alia, issuing an unmap message to the storage module 120. As disclosed above, an unused portion of the file 334C refers to a portion of the file 334C that does not contain data of the page 232, such portions of the file 334C may be referred to as unused, empty, un-needed, unmapped, unallocated, and/or the like. In the FIG. 3B embodiment, the unmap message comprises an fallocate request that identifies the unused portion(s) of the file 334C; the message includes a deallocate flag (e.g., FALLOC_FL_PUNCH_HOLE), and identifies the offset and length of the unmapped portion(s) of the file 334C (e.g., the last 4 kb of the file, or LIDs 1048-1055).

The storage module 120 may service the fwrite request by: a) mapping the file 334C to file LIDs 322C by use of the file system module 324, b) writing the compressed data CDA 341A to the storage medium 140 (e.g., at storage units 145CA[0]-145CA[23]), and c) binding LIDs of the file 334C to the stored data CDA 341A (e.g., assigning LIDs 1024-1047 to storage units 145CA[0]-145CA[23] in the forward map 132), such that portion(s) of the file 334C remain unmapped. In response to the unmap message, the storage module 120 may remove entries corresponding to the deallocated portions of the file 334C from the forward map 132 (if any) and/or write persistent metadata 247A on the storage medium 140 that records which portion(s) of the file 334C are unmapped (e.g., TRIMs LIDs 1048-1055), as disclosed above. The storage capacity consumed by the file 334C (and the page 232C) may correspond to the mappings between the LIDs of the file 334C and data on the storage medium 140. In the FIG. 3B embodiment, the file 334C is mapped to 24 512-byte storage blocks (LIDs) and, as such, consumes 12 kb of storage capacity. The unused and/or uneeded portion(s) of the file 334C do not consume storage capacity (e.g. LIDs 1048-1055 are unmapped and, as such, do not occupy storage units 145 of the storage medium 140).

In some embodiments, the file compression module 352 is configured to generate and/or store compression metadata 341 pertaining to page compression operations. The compression metadata 341A may include, but is not limited to: an uncompressed size of the page 232C (e.g., 16 kb), the size of the compressed data CDA 341A (e.g., 12 kb), identify unused portions of the page 232C and/or file 334C, the compression algorithm used to compress the data DA 340A, a compression signature, and/or the like. The compression metadata 345A may be stored at a pre-determined location within the compressed data CDA 341A (e.g., as a header to the compressed data CDA 341A).

Figure 3C:
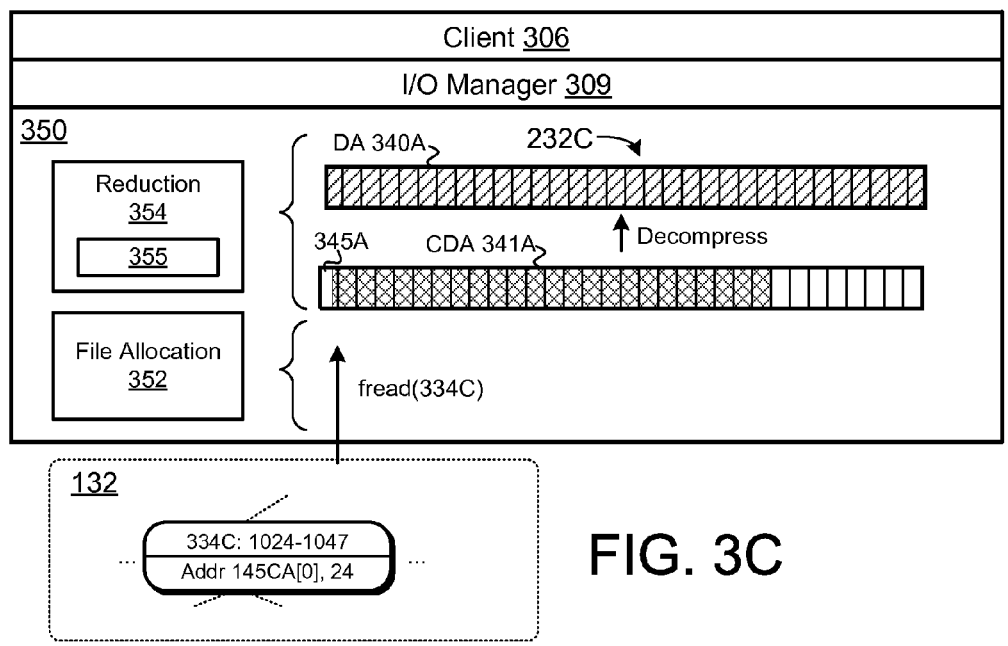
FIG. 3C depicts further embodiments of operations to manage storage compression.

FIG. 3C depicts operations to read compressed data of a page 232. In the FIG. 3C embodiment, the client 306 issues a request to read page 232C. In response, the compression manager 350 services the request by a) issuing a request to read the file 334C corresponding to the page 232C, b) decompressing the compressed data CDA 341A to acquire uncompressed data DA 340A, and c) providing the uncompressed data DA 340A to the client 306. The request to read the file 334C may comprise an fread request to read the entire file 334C (e.g., the full 16 kb represented by the file). In response to the request, the storage module 120 may map the set of LIDs 334C reserved to the file 334C (LIDs 1024-1055), determine which of the file LIDs 334C correspond to data stored on the storage medium 140 (e.g., LIDs 1024-1047) and/or which are unmapped (e.g., LIDs 1048-1055), and return the compressed data CDA 341A mapped to the file 334C (e.g., the data stored in storage units 145CA[0]-145CA[23]). Alternatively, the file allocation module 352 may maintain metadata pertaining to the portion(s) of the file 334C that are unused and, as such, the fread request issued by the compression manager 350 may be limited to the portion(s) of the file 334C that are in use (e.g., the fread request may correspond to 12 kb of data rather than the full 16 kb represented by the file 334C).

The reduction module 354 may be configured to decompress the compressed data CDA 341A by use of, inter alia, the compression module 355 and/or the compression metadata 345A of the file 334C, which, as disclosed above, may indicate a size of the compressed data CDA 341A, the size of the uncompressed data DA 340A, the compression algorithm(s) used to generate the compressed data CDA 341A, a signature of the compressed data CDA 341A and/or uncompressed data DA 340A, and so on.

Figure 3D:
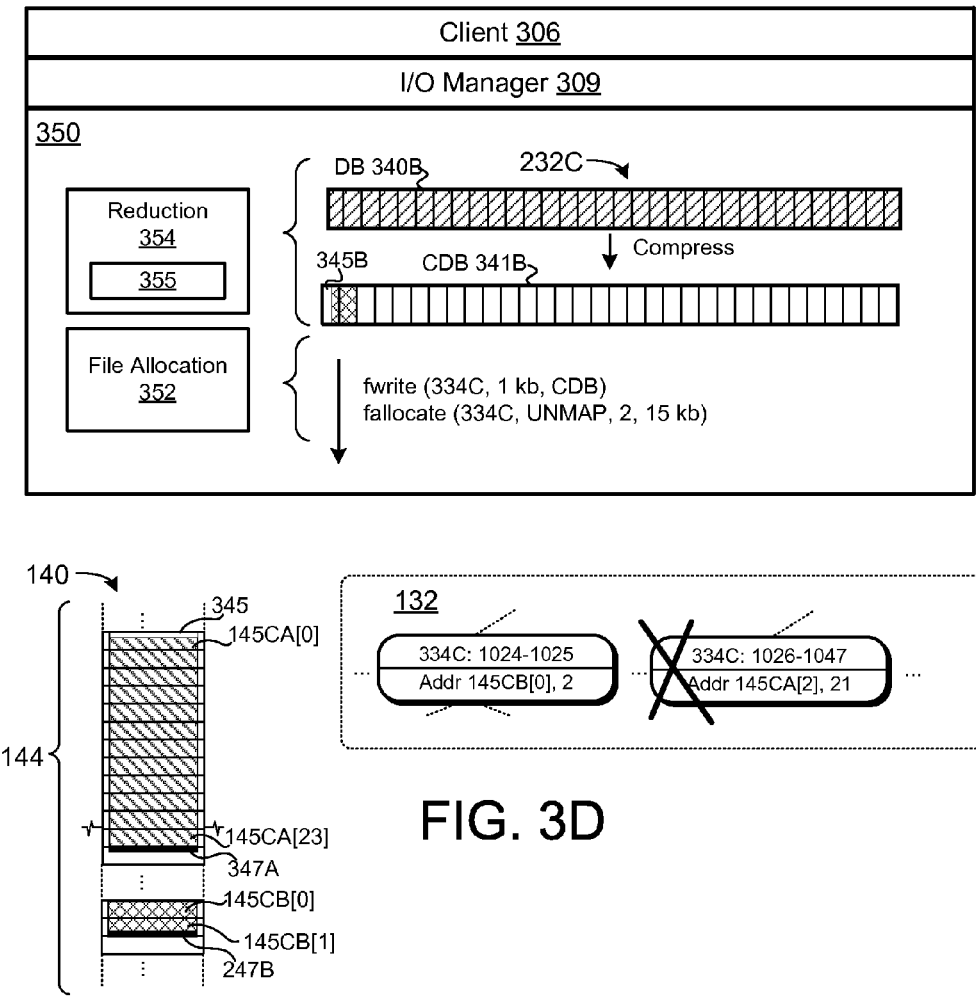
FIG. 3D depicts further embodiments of operations to manage storage compression.

FIG. 3D depicts further embodiments of operations to write compressed data to pages 232 of the client 306. In FIG. 3D, the client 306 issues a request to overwrite page 232C with data DB 340A. The compression manager 350 may service the request by: a) compressing the data DB 340B to generate compressed data CDB 341B (including compression metadata 345B), b) issuing a request to write the compressed data CDB 341B to the file 334C, and c) identifying the unused portion(s) of the file 334C for the storage module 120. In the FIG. 3D embodiment, the 16 kb of data DB 340B is compressed to 1 kb of compressed data CDB 341B. Accordingly, the fwrite request comprises a request to write 1 kb to file 334C. The unmap message (fallocate request) may indicate that 15 kb of the file 334C is unused (e.g., unmap 15 kb starting at a 1 kb offset within the file 334C).

In response to the write request, the storage module 120 a) appends the compressed data CDB 341B and compression metadata 345B to the storage log at storage units 145CB[0] and 145CB[1] and b) binds LIDs 1024-1025 of the file 334C to the stored data. The existing mappings between LIDs 1026-1047 and the obsolete compressed data CDA 340A (storage units 145CA[2]-145CA[23]) may remain in the forward map 132. These mappings may be removed from the forward map 132 in response to the unmap message (e.g., the fallocate request depicted in FIG. 3D). The storage module 120 may be further configured to append persistent metadata 247B to the storage log that identifies the unused portion(s) of the file 334C, as disclosed above (e.g., indicates that LIDs 1026-1055 of the file 334C are not in use). The capacity module 128 may, therefore, determine that the page 232C (and corresponding file 334C) occupies only 1 kb of storage capacity on the storage device 141 as opposed to the full 16 kb of storage capacity represented by the page 232C and/or file 334C.

Figure 4A:
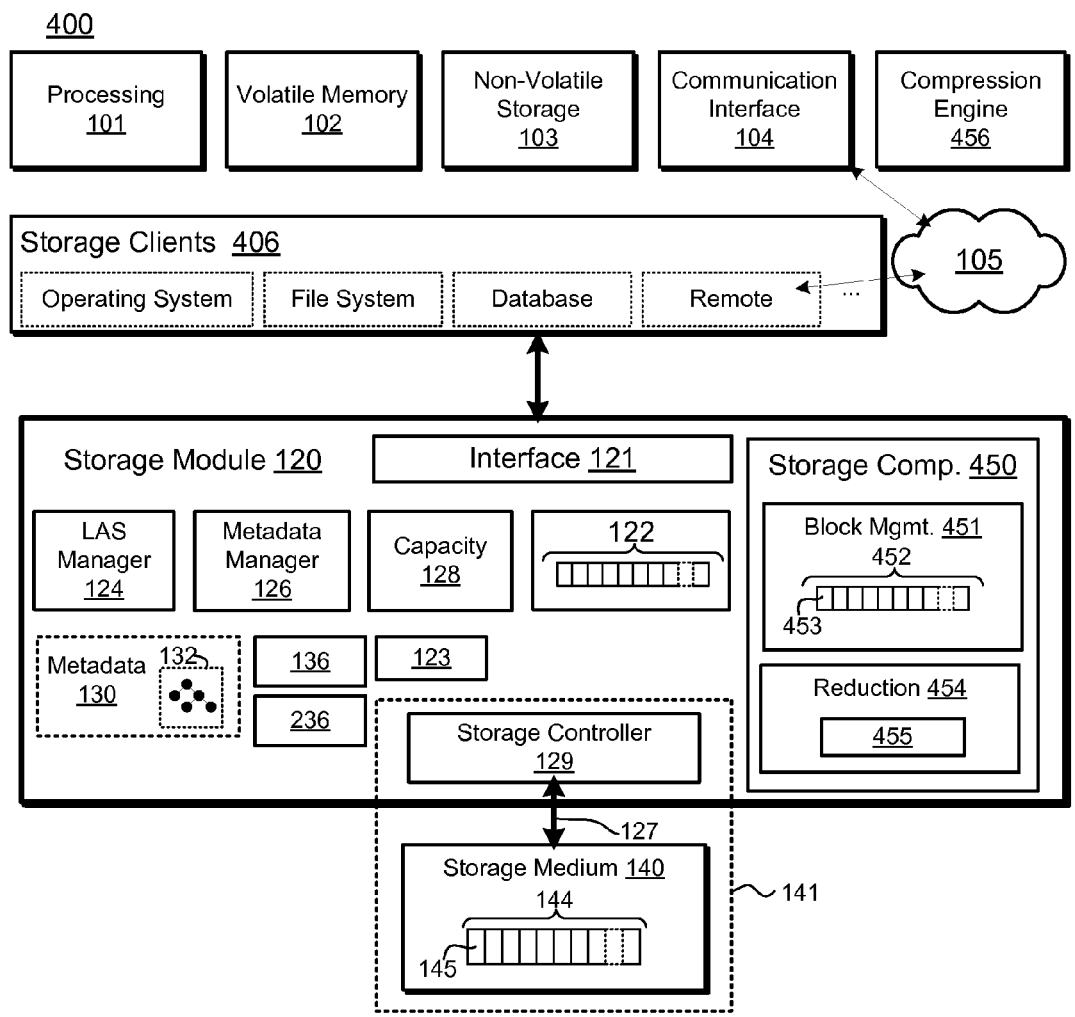
FIG. 4A is a block diagram depicting further embodiments of a computing system comprising a storage module to manage storage compression operations.

In some embodiments, the storage module 120 is configured to provide compression services to the clients 406 (as opposed to the client(s) 406 implementing their own, separate compression functionality). FIG. 4A is a block diagram of one embodiment of a computing system 400 comprising a storage module 120 configured to provide storage compression services. The storage module 120 may comprise a storage compression module 450 that provides compression services to the storage module 120 and/or storage clients 406. As used herein, "compression services" refers to operations for a) managing operations to compress data for storage on the storage medium 140 and/or b) managing operations to decompress compressed data stored on the storage medium 140. The storage compression module 130 provides compression services that are transparent to the clients 406, such that the clients 406 perform storage and/or I/O operations on uncompressed data, and the storage compression module 130 manages compression and/or decompression within the storage module 120.

In some embodiments, the storage compression module 450 comprises a block management module 451 that manages a virtual block address space (VBAS) 452. The VBAS 452 may comprise a plurality of virtual blocks 453, each corresponding to a set of two or more LIDs, which may be capable of being mapped to data stored on the storage medium 140, as disclosed herein. The VBAS 452 may, therefore, use the logical address space 122 as an intermediate translation layer between the clients 406 and data stored on the storage medium 140. The storage module 120 may present the VBAS 452 through the storage interface 121. The clients 406 may perform storage operations in reference to the virtual blocks 453 (e.g., reserve, write data to and/or read data from the virtual blocks 453 of the VBAS 452).

As disclosed above, each LID in the logical address space 122 may represent and/or correspond to a particular amount of storage capacity on the storage medium 140 (e.g., 512-byte storage units 145). The virtual blocks 453 of the VBAS 452 may comprise a plurality of LIDs (N LIDs per virtual block 453) and, as such, each virtual block 453 may represent storage capacity equivalent to N times the storage capacity represented by a single LID (e.g., N times 512 bytes).

The storage compression module 450 may further comprise a storage reduction module 454 that a) compresses data for storage on the non-volatile storage medium 140, and b) decompresses compressed data read from the non-volatile storage medium 140. The storage reduction module 454 may implement compression and/or decompression operations on data to be stored on the storage medium 140. The reduction module 454 may be configured to generate compressed data sets for storage on the storage medium. As disclosed above, a "compressed data set" refers to a data set that is smaller than an original, uncompressed data set (e.g., a data set that occupies fewer blocks, sectors, storage units 145, and/or LIDs that the original, uncompressed data set). Compressing data may include but is not limited to: but is not limited to: data compression, source coding, lossless data compression, lossy data compression, encryption, decryption, data de-duplication, data cloning, data differencing processing, and/or the like. In some embodiments, the reduction module 454 generates compressed data sets by use of a compression agent 455 and/or compression engine 456. The compression agent 455 may be configured to service data compression and/or decompression requests by use of a compression engine 456. As illustrated in FIG. 4A, the compression engine 456 may be implemented separately from the storage module 120 (e.g., may comprise a separate module, component, library, and/or service). Alternatively, the compression engine 456 may be implemented as part of the storage module 120 (e.g., as a component and/or module of the storage module 120. In some embodiments, the reduction module 454 includes and/or incorporates other types of compression functionality, such as data encryption, decryption, de-duplication, cloning, and/or the like.

In response to a request to write data to a virtual block 453, the storage compression module 450 may be configured to a) compress data corresponding to the virtual block 453 by use of the reduction module 454 (and/or compression engine 456), b) write the compressed data to one or more storage units 145 on the storage medium 140, and c) associate respective LIDs of the virtual block 453 with the storage units 145 comprising the compressed data (e.g., in the forward map 132). Depending on the compression ratio, one or more of the LIDs associated with the virtual block 453 may be unbound (e.g., not used to reference compressed data of the virtual block 453). As disclosed above, LIDs that are not bound to data stored on the storage medium 140 may not consume the storage resources, even if such LIDs are reserved to a particular client 406 and/or virtual block 453.

Figure 4B:
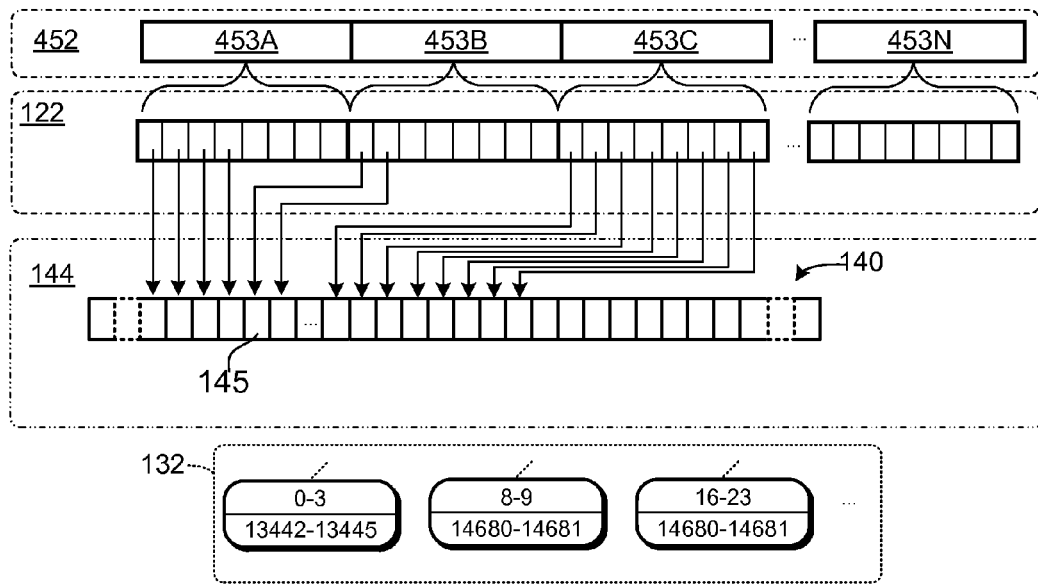
FIG. 4B depicts embodiments of a virtual block address space.

FIG. 4B depicts one embodiment of a VBAS 452 managed by the storage compression module 450 (by use of the block management module 451). In the FIG. 4B embodiment, each of the virtual blocks 453A-N comprises eight LIDs; the block 453A comprises LIDs 0-7, the block 453B comprises LIDs 8-15, and so on. In the FIG. 4B embodiment, the LAS management module 124 and/or block management module 451 may be configured to map virtual blocks 453 to LIDs by, inter alia, bitwise shifting LIDs (removing the three least significant bits of the LIDs). Each shifted LID may correspond to a respective block 453A-N, such that eight LIDs map to each unique virtual block 453A-N (the addresses of the virtual blocks 453A-N may correspond to shifted LIDs). The disclosure is not limited in this regard, however, and could be adapted to associate virtual blocks 453A-N with sets of LIDs using any suitable technique including, but not limited to: a hash mapping, a modulo mapping, and/or the like. Since each virtual block 453A-N comprises eight LIDs, and assuming 512-byte storage units 145, each block 452 A-N may represent 4 kb of storage capacity.

As illustrated in FIG. 4B, the virtual blocks 453A-N may be mapped to storage locations 145 within the storage address space 144 through LIDs of the logical address space 122. Accordingly, the LAS Management module 124 and/or block management module 451 may use the logical address space 122 as an intermediate translation layer between the VBAS 452 and the storage address space 144 of the storage medium 140.

The storage compression module 450 may be configured to compress data of the virtual blocks 453 for storage on the storage medium 140. The storage module 120 may service requests to write data to a virtual block 453A by: a) compressing the data by use of the reduction module 454 (from 4 kb uncompressed data to 2 kb of compressed data), b) writing the 2 kb of compressed data on the storage medium 140 (e.g., within four 512-byte storage units 145), and c) binding LIDs of the virtual block 453A to the storage units 145 comprising the compressed data (LIDs 0-3) in the forward map 132, such that one or more of the LIDs of the virtual block 453A remain unbound. In the FIG. 1B embodiment, LIDs 4-7 of the block 453A are not bound to storage units 145 on the storage medium 140. Therefore, although the block 453A represents 4 kb of storage capacity, the block 453A consumes only 2 kb of storage capacity on the storage medium 140.

The amount of storage resources consumed by a particular virtual 453A-N may, therefore, depend on the compression ratio of data of the virtual block 453A-N (e.g., the underling mappings between LIDs of the virtual block 453A-N and storage units 145). As illustrated in FIG. 4B, another virtual block 453B may comprise data that is compressed to 1 kb. Accordingly, only two LIDs of block 453B may be assigned to storage units 145 on the storage medium 140. The remaining six LIDs are unassigned. Another virtual block 453C may comprise 4 kb of data that cannot be compressed. As such, all of the LIDs of the block 453C are tied to respective storage units 145 on the storage medium 140. The virtual block 453C may, therefore, occupy the full 4 kb of storage capacity represented by the virtual block 453C.

The storage compression module 450 may service a request to read data from block 453A by: a) accessing the compressed data corresponding to the block 453A by use of the forward map 160 (e.g., based on the assignments between LIDs 0-3 and storage units 145 in the forward map 160), and b) providing the decompressed data in response to the request. The data may be decompressed by use of the reduction module 454 and/or compression engine 456, as disclosed above. Accordingly, data compression operations implemented within the storage module 120 may be transparent to the storage clients 406, such that it may appear to the storage clients 406 as if the storage operation(s) are being implemented by use of uncompressed data.

The capacity module 128 of the storage module 120 may determine the physical storage capacity consumed by the virtual blocks 453A-N by use of the forward map 132. As disclosed above, assignments between LIDs of a virtual block 453A-N and storage units 145 represent physical storage usage, whereas LIDs that are associated with a virtual block 453A-N but are not bound to data on the storage medium 140 do not. Accordingly, in the FIG. 4B embodiment, although each virtual block 453A-N represents 4 kb of storage capacity, the capacity module 128 may determine that virtual block 453A consumes only 2 kb (based on the assignments of LIDs 0-3), virtual block 453B consumes only 1 kb (based on the assignments of LIDs 8-9), and virtual block 453C consumes the full 4 kb (based on the assignments of LIDs 16-23).

Figure 4C:
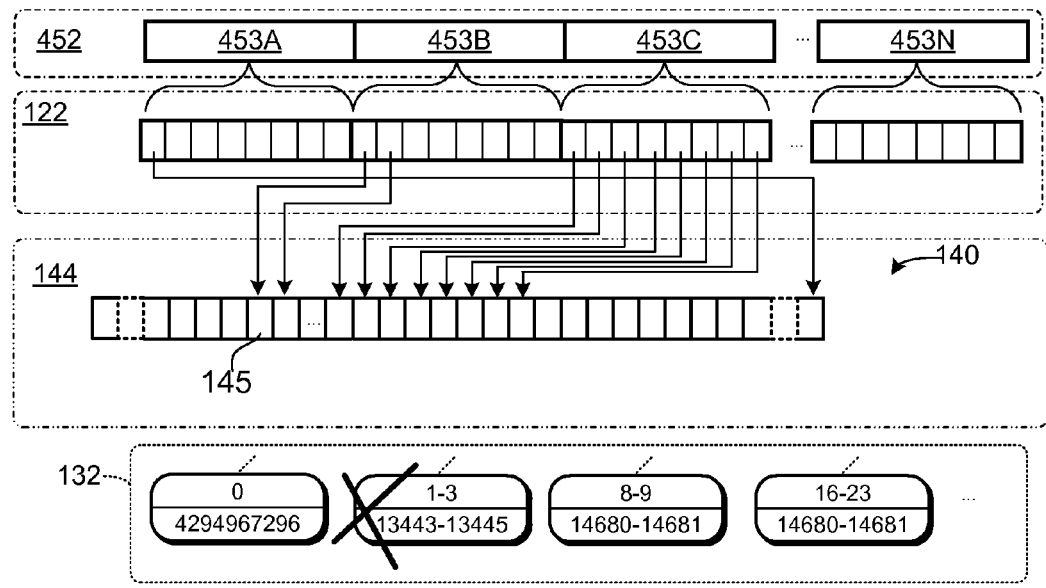
FIG. 4C depicts further embodiments of a virtual block address space.

The storage compression module 450 may be further configured to identify and/or record which LIDs are not currently in use to reference data storage on the storage medium 140. As illustrated in FIG. 4C, a client 406 may modify and/or overwrite virtual block 453A. The updated data maybe compressed from the full 4 kb size of the virtual block 453A to 512 bytes. The storage compression module 450 may write the compressed data of virtual block 453A to a single LID (LID 0) at storage address 4294967296 (by use of the storage controller 129). LID 0 may be bound to the updated storage address, replacing the obsolete mapping between LID 0 and storage address 13442. Mappings between other LIDs of the virtual block 453A that have not been overwritten, however, may remain in the forward map 132 (and on the storage medium 140). The storage compression module 450 may be configured to record which LIDs of the virtual block 453A are not in use by a) updating the forward map 132 to remove entries corresponding to the unused LIDs (e.g., removing mappings pertaining to LIDs 1-3), and/or writing persistent deallocation metadata 247 (not shown) on the storage medium 140 to ensure that the deallocation of LIDs 1-3 is persistent and crashsafe, as disclosed above.

Figure 4D:
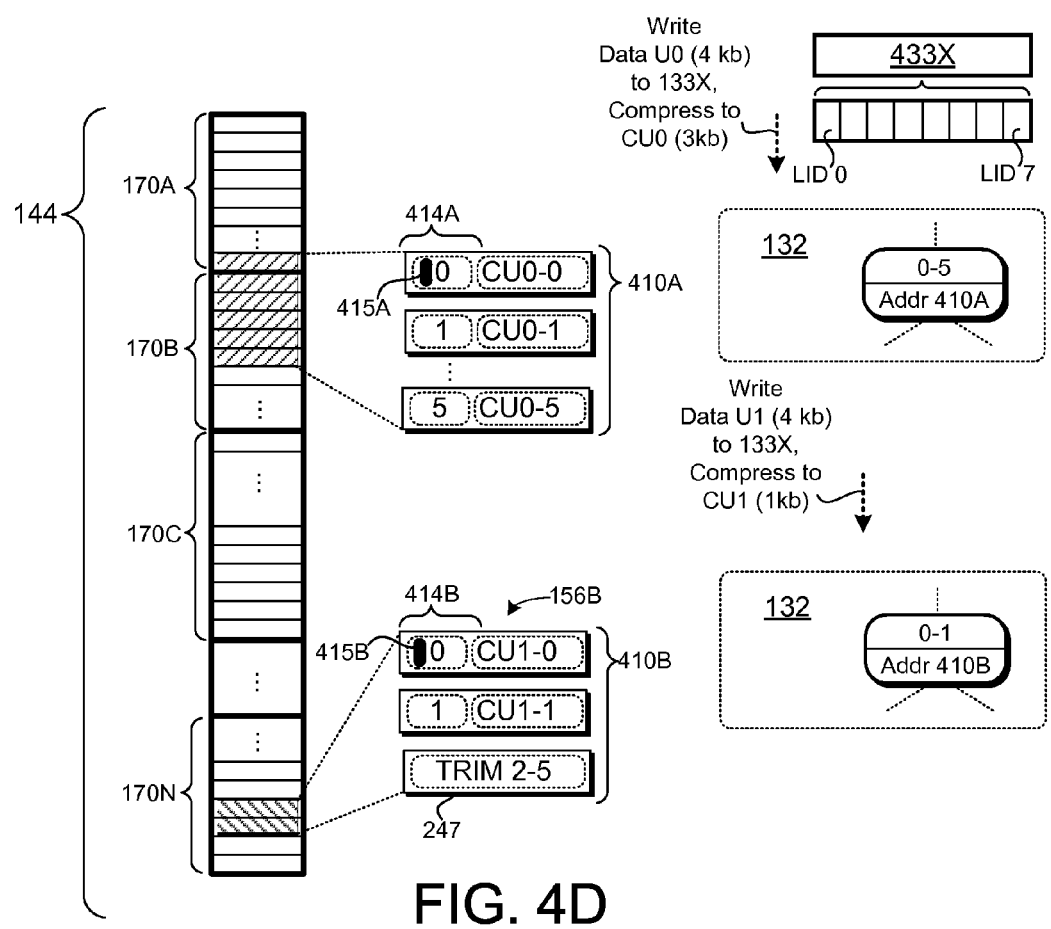
FIG. 4D depicts embodiments of operations to manage storage compression.

FIG. 4D depicts further embodiments of storage compression operations implemented by the storage module 120. In the FIG. 4D embodiment, the block size of the storage module 120 may be 512 bytes, such that each LID of the logical address space 122 may be capable of referencing a storage unit 145 (a block, sector, data packet 110, and/or the like) capable of storing 512 bytes of data. Each LID may, therefore, represent 512 bytes of storage capacity (512-byte blocks). The virtual blocks 453 of the VBAS 452 may represent 4 kb storage blocks and, as such, each virtual block 453 corresponds to eight LIDs.

The storage module 120 may service a request to write data U0 to virtual block 453X. Servicing the request may comprise compressing the data U0 by use of the reduction module 454 (and/or compression engine 456) and appending the compressed data to the storage log on the storage medium 140, as disclosed above. The data U0 may be compressed into 3 kb of compressed data CU0. The compressed data CU0 may, therefore, be stored within six data packets 410A. The data packets 410A may be stored within respective storage units 145 of the storage medium 140 (e.g., the compressed data may be stored as respective data segments 112 CU0-1 through CU0-5 within the data packets 410A). The data packets 410A may be tied to LIDs 0-5 of the virtual block 453X in the forward map 132 (and/or by use of persistent metadata 414A within the respective data packets 410A). The remaining LIDs associated with the block 453A (LIDs 6-7) remain unassigned (are not bound to data stored on the storage medium 140). Accordingly, the physical storage capacity occupied by the virtual block 453X is 3 kb, rather than the 4 kb represented by the virtual block 453X. As illustrated in FIG. 4D, the data packets 410A comprising the compressed data CU0 of virtual block 453X may span multiple storage divisions (data packets 410A are stored within both storage divisions 170A and 170B). Servicing the request to write the virtual block 453X may further comprise acknowledging completion of the request in response to a)

writing the data packets 410A to the storage medium 140, and b) mapping the LIDs 0-5 to the data packets 410A, as disclosed above.

In some embodiments, the storage compression module 450 is configured to include compression metadata pertaining to compressed data stored on the storage medium 140. The compression metadata may be embodied as persistent metadata 114 stored with one or more of the data packets 110 comprising a compressed data segment 112. The compression metadata may include, but is not limited to: an uncompressed size of the data segment(s) 112 within one or more data packets 110 (e.g., 4 kb), the size of the compressed data (e.g., 3 kb), the number of LIDs used by the corresponding block 453, the compression algorithm used to compress the data, a compression signature (e.g., checksum of the compressed data), and/or the like. The compression metadata may further indicate the LIDs of the block 453 that are unassigned (e.g., LIDs that are not mapped to storage units 145 due, inter alia, to data compression). The compression metadata may be acquired by the reduction module 454 and/or LAS Management module 124 and may be passed to the log storage module 136 and/or write module 240 through the storage controller 129.

In the FIG. 4D embodiment, the data packets 410A may comprise persistent compression metadata 415A, as disclosed above. The compression metadata 415A may be included within the persistent metadata 414A of one or more of the data packets 410A by the log storage module 136 and/or write module 240. The compression metadata 415A may include, but is not limited to: an uncompressed size of the data U0 (e.g., 4 kb), the size of the compressed data (e.g., 3 kb), the number of LIDs used by the block 453X (e.g., LIDs 0-5), identify the LIDs of the virtual block 453X that are not in use (e.g., unmapped LIDs 6-7), the compression algorithm used to compress the data U0, a compression signature, and so on.

The storage module 120 may service a request from a client 406 to read the virtual block 453X by a) mapping the virtual block 453X to a set of logical identifiers 122 (e.g., LIDs 0-7), b) determining which LIDs of the virtual block 453X are bound to data stored on the storage medium 140, and the storage addresses of the corresponding data packets 410A by use of, inter alia, the forward map 132, c) reading the compressed data CU0 from the data packets 410A, d) decompressing the compressed data CU0 by use of the reduction module 454, and e) returning the compressed data U0 to the client 406. Reading the data U0 may further comprise accessing the compression metadata 415A stored with the data packets 410A. The compression metadata 415A may indicate the size of the compressed data CU0, which may be used to determine the number of packets 410A to read from the storage medium 140 (and/or validate the LID assignments in the forward map 132). The compression metadata 415A may further indicate the compression algorithm(s) used to compress the data CU0, which may enable the reduction module 454 to select an appropriate decompression algorithm and/or compression engine 456. The compression metadata 415A may further include a compression signature, which may be used to verify the integrity of the compressed data CU0 and/or decompressed data U0.

Compressed data may be modified, overwritten, and/or updated out-of-place on the storage medium 140, as disclosed herein. The storage module 120 may receive a request to modify and/or overwrite virtual block 453X with data U1 through the storage interface 121. The storage module 120 may service the request by: a) compressing the data U1 by use of the reduction module 454, and b) appending data packets 410B comprising the compressed data CU1 at the current append point 180 of the storage log. In the FIG. 4D embodiment, the data U1 may be compressed to 1 kb and, as such, may be stored within two storage units 145 (two data packets 410B). The data packets 410B may comprise respective data segments 112 that include respective portions of the compressed data (CU1-0 and CU1-1). The data packets 410B may further include persistent compression metadata 415B, which may indicate the uncompressed size of the uncompressed data U1 (4 kb), the size of the compressed data CU1 (1 kb), the LIDs used to reference the compressed data CU1 (LIDs 0 and 1), unmapped LIDs of the virtual block 453X (LIDs 2-7), the compression algorithm, data signature(s), and so on, as disclosed above.

The data packets 410B may be bound to respective LIDs 0 and 1 by use of the persistent metadata 414B and/or the forward map 132, as disclosed herein. Other LIDs of the virtual block 453X may be unassigned. As disclosed above, unmapping, unassigning, unbinding, and/or deallocating a LID may comprise removing the LID from the forward map 132. Accordingly, servicing the request to write data U1 of virtual block 453X may further comprise recording that LIDs 2-7 are not in use (are unbound). In some embodiments, recording the status of LIDs 2-7 comprises removing the LIDs 2-7 from the forward map 132 and/or including persistent compression metadata 415B pertaining to the status of LIDs 2-7 in one or more of the packets 410B comprising the compressed data CU1. Alternatively, or in addition, the storage module 120 may unmap the LIDs 2-7 by use of persistent deallocation metadata 247 stored within the storage log on the storage device 141. The persistent deallocation metadata 247 may be stored in response to determining that the virtual block 453X has shrunk (e.g., is using fewer blocks or LIDs than a previous version of the virtual block 453X). The virtual block 453X may shrink due to, inter alia, data compression properties of the data stored in the virtual block 453X. As illustrated above, the compression engine 456 may be capable of compressing data U0 down to 3 kb in size, but may be capable of compressing data U1 down to 1 kb. As such, when the data U1 is written to block 453X, the compressed data CU1 occupies fewer storage units 145 (and corresponding LIDs) than the compressed data CU0. Therefore, LIDs 2-5 that were previously included in the forward map 160 are no longer in use. The persistent deallocation metadata 247 may identify the LIDs 2-5 that are no longer in use. Alternatively, or in addition, the persistent deallocation metadata 247 may identify all of the LIDs associated with the virtual block 453X that are unassigned (e.g., identify LIDs 2-7).

As illustrated in FIG. 4D, writing compressed data U0 and/or U1 to the storage medium 140 may comprise storing a plurality of different data packets 410A and/or 410B within respective storage units 145, which may span multiple storage divisions, rows 154, storage arrays 150A-N, and/or banks 158A-N. Therefore, and as disclosed above, the storage module 120 may be configured to store data packets 410A and/or 410B atomically by use of, inter alia, the atomic storage module 236.

The capacity module 128 may determine status information pertaining to LIDs of the logical address space 122 and/or virtual blocks 453 of the VBAS 452. The capacity module 126 may provide status information pertaining to the LIDs and/or virtual blocks 453 in response to requests received via the interface 121. Alternatively, or in addition, the capacity module 126 may be configured to publish status information to storage clients 406 using a call-back interface, push interface, publication interface, and/or the like. The status information provided by the capacity module 126 may include, but is not limited to: whether a LID is currently in use to reference data stored on the storage medium 140, whether a LID exists within the forward map 132, the physical storage capacity used by LID, the range of LIDs, and so on. The capacity module 126 may be further configured to provide such status information for sets, groups, and/or collections of LIDs, such as virtual blocks 453 of the VBAS 452. As disclosed above, the physical storage capacity used by a virtual block 453 may correspond to the number of storage blocks (LIDs) that are in use to store data of virtual block 453. The capacity module 126 may be further configured to provide physical storage capacity usage information for the storage medium 140 and/or storage device 141, such as the amount of physical storage capacity available on the storage medium 140, the total physical storage capacity currently being used by the logical address space 122 and/or VBAS 452, and/or the like.

The capacity module 126 may determine LID and/or virtual block 453 status information by use of the persistent, crash-safe metadata 130, such as the forward map 132. As disclosed herein, the forward map 132 is configured to maintain associations between LIDs, virtual blocks 453, and data stored on the storage device 141 (storage units 145). LIDs that exist in the forward map 132 are bound to data stored on the storage device 141 and, as such, represent physical storage resource usage. LIDs that do not exist in the forward map 132 are not tied to stored data and, as such, do not represent usage of physical storage resources. Accordingly, physical storage resources consumed by LIDs of the logical address space 122 and/or virtual blocks 453 of the VBAS 452 may be derived from the mapping information maintained in the forward map 132 (e.g., whether particular LIDs "exist" within the forward map 132).

The LAS Management module 124 and/or block management module 451 may translate between the virtual blocks 453A-N of the VBAS 452 and LIDs of the logical address space 122 (by use of the translation module 123 and/or forward map 132). Therefore, the logical address space 122 may serve as an intermediate mapping layer between virtual blocks 453A-N and storage units 145. The capacity module 126 may determine the physical storage resources consumed by a particular virtual block 453A-N based on the associations between LIDs of the particular virtual block 453A-N and storage units 145 per the forward map 132. Referring to the FIG. 4B embodiment, the capacity module 126 may determine that virtual block 453A consumes storage capacity corresponding to four storage units 145 (2 kb) by a) mapping the block 453A to LIDs 0-7 in the logical address space 122, and b) determining that LIDs 0-3 are assigned to storage units 145 (storage addresses 13442-13445) and that LIDs 4-7 are unassigned. The capacity module 126 may, therefore, determine that the virtual block 453A, which represents 4 kb of storage capacity, consumes only 2 kb of storage capacity on the storage medium 140. The capacity module 126 may determine that the virtual block 453B consumes 1 kb of storage capacity, and that the block 453C consumes 4 kb of storage capacity.

The capacity module 126 may be configured to determine the total physical storage capacity consumed by the virtual blocks 453A-N of the VBAS 452 by summing the physical storage capacity consumed by each of the blocks 453A-N. The available capacity on the storage device 141 may, therefore, be calculated by subtracting a total, available storage capacity of the storage medium 140 from the physical storage capacity consumed by the virtual blocks 453A-N.

Figure 5:
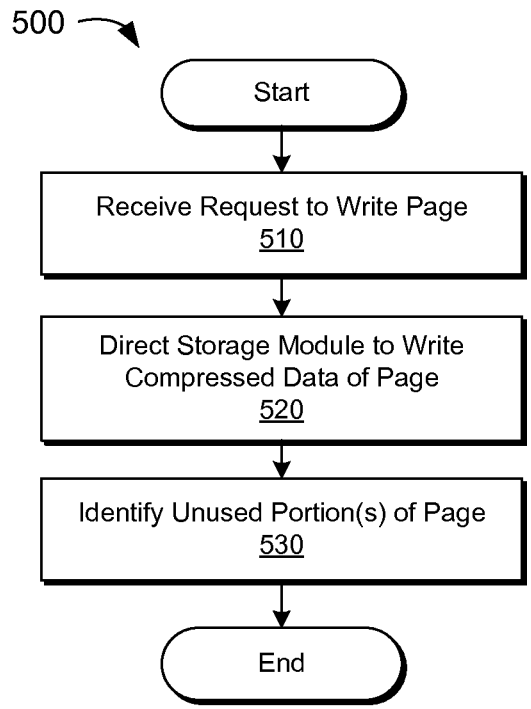
FIG. 5 is a flow diagram of one embodiment of a method for managing storage compression operations.

FIG. 5 is a flow diagram of one embodiment of a method 500 for providing storage compression services. Portions of the method 500, and the other methods, processes, and/or operations disclosed herein, may be embodied as a computer program product comprising instructions stored on a non-transitory computer-readable storage medium. The instructions may be configured to cause the computing device to perform steps of the disclosed methods, processes, and/or operations. Alternatively, or in addition, portions of the method 500, and the other methods, processes, and/or operations disclosed herein, may be tied to a particular machine, such as a processor, storage medium, hardware controller(s), and/or the like.

Step 510 of the method 500 may comprise receiving a request to write data of a page 232 to the storage medium 140. The page 232 may have a particular block size, such that the page 232 represents a particular amount of storage capacity. The page 232 may correspond to a fixed number of blocks on the storage medium 140 (e.g., a fixed number of LIDs in a LID set 222, a fixed number of sectors, and/or the like). In some embodiments, the page 232 may represent a particular amount of physical storage capacity (e.g., 16 kb), which may correspond to set of two or more blocks of the storage module 120 (e.g., a LID set 222 comprising two or more LIDs of the logical address space 122). Accordingly, the page 232 may comprise a plurality of LIDs, such as a LID group, set, range, extent, and/or the like.

The request of step 510 may relate to a client 206 that comprises a client compression module 250. The client compression module 250 may be configured to compress data of the page for storage. As disclosed above, compressing a page may include, but is not limited to: compressing data of the page, de-duplicating data of the page, cloning data of the page, and/or the like. Step 510 may comprise deriving a data set from the page 232, such that the data set is smaller than the size of the page 232 (e.g., occupies fewer number of blocks, sectors, LIDs than represented by the page 232). Step 510 may comprise deriving compressed data corresponding to the page 232. In some embodiments, the page 232 is designated as a compressed page by the client 206. The client 206 may, for example, indicate that the data of the page 232 is to be compressed for storage on the storage medium 140, such that operations to read, write, and/or modify the page 232 are serviced by use of the client compression module 250.

In some embodiments, the page 232 is associated with and/or comprises a set of two or more LIDs of the logical address space 122 (e.g., a LID set 222). The LIDs associated with the page 232 may be reserved for use by the client 206 in metadata 130 maintained by the storage module 120, such as a reservation map 142, forward map 132, and/or the like. LIDs reserved by use by the client 206 and/or page 232, and which are not bound to data stored on the storage medium 140, may be deemed to not occupy and/or consume physical storage resources of the storage medium 140. Accordingly, the client 206 may reserve large regions of the logical address space 122 for pages 232 (and/or other storage entities), without consuming physical storage resources of the storage medium 140.

Alternatively, or in addition, the page 232 may be associated with a file 334. The file may be sized in accordance with the physical storage capacity of the page 232. Accordingly, the file 334 may represent an equivalent amount of physical storage capacity as the page 232 (e.g., both the page 232 and the file 334 may represent 16 kb of storage capacity). The file 334 may be managed by a file system module 334 of the storage module 120, as disclosed herein.

Step 520 may comprise directing the storage module 120 to write data of the page to the storage medium 140. The data written at step 520 may comprise a reduced-size data set, such as compressed data derived from uncompressed data of the page 232, as disclosed above. Step 520 may comprise writing the data of the page to fewer blocks, sectors, and/or LIDs that the amount of blocks, sectors, and/or LIDs represented by the page 232. Step 520 may comprise issuing a write request to write data to a particular set of blocks (e.g., a subset of the LIDs associated with the page 232). As disclosed above, the request may specify fewer blocks than the fixed number of blocks represented by the page 232. In some embodiments, the request of step 520 identifies a subset of LIDs needed to write the data of the page 232. Alternatively, the request may include the full set of LIDs associated with the page 232 (e.g., the full range of LIDs in a LID set 222), and the actual size of the reduced-size data set may be derived from an offset and/or length of the data to be written to the storage medium 140 (e.g., may be determined from the size of the data set to be written to the page). Alternatively, or in addition, directing the storage module 120 to write the data may comprise issuing a request to write the data to a file 334 associated with the page 232, as disclosed above.

In response to step 520, the storage module 120 may a) write the reduced-size data set corresponding to the page 232 (e.g., compressed data) on one or more storage units 145 of the storage medium 140, and b) map the page 232 to the storage units 145 by use of the forward map 132 (e.g., by assigning LIDs of the page 232 to the addresses of the storage units 145 comprising the compressed data of the page 232). The page 232 may, therefore, be mapped the reduced-size data set through a subset of the LIDs associated with the page 232. The physical storage capacity used by the page 232 may correspond to the number of LIDs in the LID set 222 that are mapped to storage units 145 (and the block size of the storage units 145), and may exclude the LIDs in the LID set 222 that are unmapped. In some embodiments, writing step 520 further comprises assigning the LIDs and/or storage units 145 to the file 334 associated with the page 232, as disclosed above.

Step 530 may comprise identifying to the storage module 120, which portion(s) of the page 232 are unused due to, inter alia, page data compression. Step 530 may comprise identifying which blocks of the fixed number of blocks represented by the page 232 are not in use (e.g., do not contain compressed data of the page 232). Step 530 may comprise issuing a hint or message to the storage module 120 that identifies one or more LIDs of the LID set 222 corresponding to the page 232 that are not in use due to, inter alia, page compression. Step 530 may comprise issuing one or more of a TRIM message, an unmap message, a deallocation message, a TRIM directive or command, a persistent TRIM directive or command, an fallocate message, and/or the like. In response, the storage module 120 may be configured to unmap one or more LIDs in the forward map 132 and/or write persistent deallocation metadata 247 on the storage medium 140, as disclosed above. Alternatively, or in addition, identifying to the storage module 120, which blocks of the fixed number of blocks represented by the page 232 are not in use may comprise identifying portions of the file 334 associated with the page 232 are empty. In some embodiments, step 530 comprises issuing an fallocate message to the file system module 324 that identifies an offset and/or length of the unused portion(s) of the file 334, as disclosed above. The storage module 120 may be further configured to record that one or more of the LIDs associated with the page 232 do not contain compressed data and/or that portion(s) of the file 334 associated with the page 232 are empty, which may comprise a) removing one or more entries from the forward map 132, b) writing persistent metadata 247 to the storage medium 247, and/or the like, as disclosed above.

Figure 6:
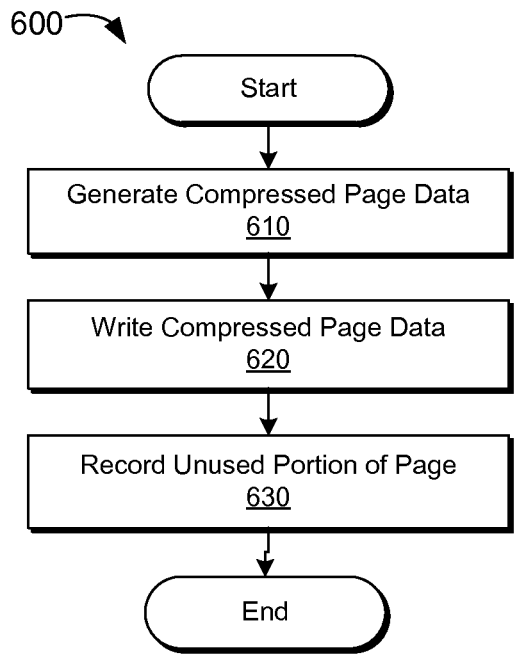
FIG. 6 is a flow diagram of another embodiment of a method for managing storage compression operations.

FIG. 6 is a flow diagram of another embodiment of a method 600 for providing storage compression services. Step 610 may comprise generating compressed page data. Step 610 may comprise generating the compressed page data in response to a request to persist a page 232, and/or write data to a group, set, range, and/or extent of LIDs. The page 232 of step 610 may be defined to have a particular size and, as such, may include and/or represent a fixed number of sectors on a storage medium 140. The page 232 may correspond to the physical storage capacity of a plurality of storage blocks, sectors, storage units 145, data packets 110, and/or the like. The page 232 may, for example, represent a 16 kb block, that corresponds to 32 separate 512 byte sectors of a storage module 120 (e.g., 32 LIDs, storage units 145, data packets 110, blocks, and/or the like). The compressed page data may be smaller than the fixed number of sectors represented by the page 232 (e.g., smaller than 16 kb). The compression of step 610 may be implemented by a client compression manager 250 or 350, and/or a storage compression module 450 of the storage module 120.

Step 620 may comprise writing the compressed data of the page 232 on the storage medium 140, such that the compressed data is stored on fewer sectors than the number of sectors represented by the page 232. Step 620 may comprise storing compressed data to a subset of a LID set 222 associated with the page 232. Alternatively, or in addition, step 620 may comprise storing compressed data within a file 334 associated with the page 334, such that a portion of the file 334 remains empty and/or unused.

Step 630 may comprise recording which sectors of the page 232 are not in use. Step 630 may comprise a) removing entries associated with the page 334 from a forward map 132 and/or b) writing persistent metadata 247 to the storage medium 140 that identifies the unused sectors of the page 232 (by use of the storage module 120 and/or metadata manger 126). The persistent metadata 247 may identify which LIDs of a LID set 222 associated with the page 232 are unassigned. In some embodiments, step 630 comprises recording which portion(s) of the file 334 associated with the page 232 are unused and/or empty (e.g., an offset and/or length of the empty portion(s) of the file 334).

The step 630 comprises determining whether the page 232 has shrunk on the storage medium 140. As disclosed herein, a page 232 may be deemed to have shrunk in response to determining that the page 232 occupies less capacity on the storage medium 140 than a previous version of the page 232. Accordingly, a page 232 is determined to have shrunk in response to determining that the compressed data of the page 232 is stored within fewer blocks, sectors, LIDs, data packets 110, storage units 145, and/or the like than a previous version of the page 232. Step 630 may comprise writing the persistent metadata 247 in response to determining that the pace 232 has shrunk. The persistent metadata 247 may not be written if the compressed data occupies the same or more storage capacity than the previous version of the page 232.

In some embodiments, step 630 further comprises determining a physical storage capacity used by the page 232. As disclosed above, the physical storage capacity used by the page 232 may be based on the number of blocks, sectors, LIDs, data packets 110, storage units 145, and/or the like used to store the compressed data of the page on the storage medium 145. The size of the page 232 may, therefore, be determined based on mappings between LIDs of the page 232 and data on the storage medium 140 (e.g., the number and/or extent of entries 134 associated with the page 232 in the forward map 132). LIDs of the page 232 that are not mapped, assigned, and/or bound to data on the storage medium 140 may not represent storage capacity usage of the page 232. Accordingly, the physical storage capacity consumed by the page 232 may include page LIDs that exist in entries 134 of the forward map 132 and exclude page LIDs that do not exist in the forward map 132 (e.g., exclude LIDs that are not in the forward map 132 and/or are only in reservation entries 135 of the forward map 132). In some embodiments, step 630 may further comprise determining the physical storage capacity consumed by a plurality of pages 232 (and/or a range and/or extent of LIDs of the logical address space 122) using forward map 132, as disclosed above.

Figure 7:
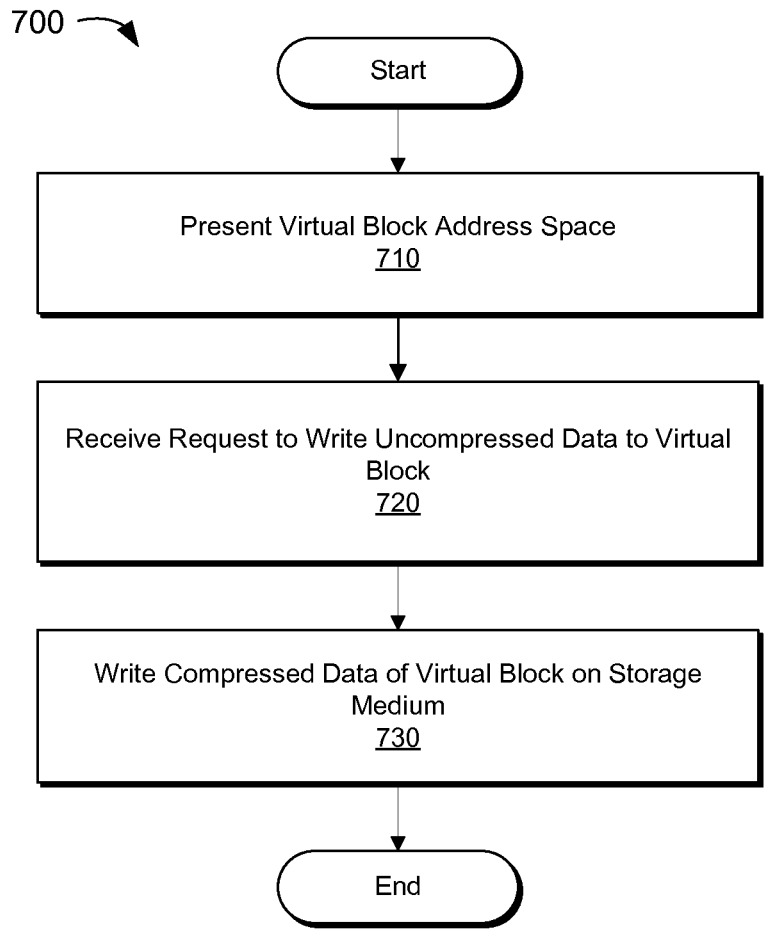
FIG. 7 is a flow diagram of another embodiment of a method for managing storage compression operations.

FIG. 7 is a flow diagram of another embodiment of a method 700 for implementing storage compression. Step 710 may comprise presenting a VBAS 452 to storage clients 406. The VBAS 452 may comprise virtual blocks 453 that correspond to respective sets of LIDs of a logical address space 122. Accordingly, the VBAS 452 may use the logical address space 122 as an intermediate translation layer. Step 710 may further comprise mapping blocks 453 of the VBAS 452 to respective sets of LIDs, as disclosed herein.

Step 720 may comprise receiving a request to write uncompressed data to a virtual block 453 of the VBAS 452. The request may be received through the storage interface 121 of the storage module 120. Step 730 may comprise writing compressed data corresponding to the virtual block 453, such that one or more of the LIDs associated with the virtual block 453 remain unused. Step 730 may comprise a) accessing compressed data corresponding to the uncompressed data of the virtual block 453, b) writing the compressed data to respective storage addresses on the storage medium 140 (e.g., appending the compressed data to the storage log, as disclosed above), and c) assigning LIDs to the compressed data, such that one or more of the LIDs mapped to the virtual bock 453 remain unassigned. Step 730 may further comprise storing persistent metadata 247 on the storage medium 140 that identifies the unused portion(s) of the virtual block 453 (e.g., indicates which LIDs of the virtual block 453 are not in use).

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, a special purpose computer, or another programmable data processing apparatus to produce a machine, such that the instructions that execute on the computer or another programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or another programmable data processing apparatus to cause a series of operational steps to be performed on the computer or another programmable apparatus to produce a computer-implemented process, such that the instructions that execute on the computer or another programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

We claim:

1. A method, comprising:
    receiving a request to write data of a page to a non-volatile storage medium, wherein the page comprises a plurality of logical blocks of a logical address space, each logical block representing storage capacity of the non-volatile storage medium;
    directing a storage module to store the data of the page to a first set of the logical blocks of the page, the first set excluding a second set of the logical blocks of the page; and
    transmitting a message to the storage module responsive to the directing, the message configured to identify the second set of the logical blocks of the page that are not being used to store the data of the page on the non-volatile storage medium, wherein:

the first set of the logical blocks of the page are associated with physical storage locations used to store the data of the page on the non-volatile storage medium, and the second set of the logical blocks of the page are unassociated with physical storage locations of the non-volatile storage medium, such that a physical storage capacity consumed by the page on the non-volatile storage medium is less than the storage capacity represented by the plurality of logical blocks comprising the page.

2. The method of claim 1, further comprising compressing the data of the page.

3. The method of claim 1, wherein the page is designated as a compressed page by a client.

4. The method of claim 1, wherein the page corresponds to a file, and wherein directing the storage module to store the data of the page comprises issuing a request to write the data of the page to the file.

5. The method of claim 1, wherein storing the data of the page comprises:

appending the data of the page to a storage log on the non-volatile storage medium; and recording mapping entries in a forward index, the mapping entries configured to associate the first set of logical blocks with the physical storage locations of the data of the page appended to the storage log;

wherein, in response to the message, the storage module is further configured to retain the mapping entries pertaining to the first set of the logical blocks in the forward index and to invalidate mapping entries pertaining to logical blocks of the second set of the logical blocks in the forward index.

6. The method of claim 1, further comprising directing the storage module to write persistent metadata on the non-volatile storage medium, the persistent metadata indicating that the second set of the logical blocks are unassociated with data stored on the non-volatile storage medium.

7. An apparatus, comprising:

a compression manager that receives a request to persist a page corresponding to a plurality of logical block addresses of a logical address space, wherein the page represents a fixed amount of storage capacity of a persistent storage device, the fixed amount corresponding to a storage capacity represented by the plurality of logical block addresses of the page;

a reduction engine that derives a data set from data of the page, wherein the data set is smaller than the fixed amount of storage capacity represented by the page;

a file allocation manager that persists the page, by instructing a file system to write the data set to a first subset of the plurality of logical block addresses of the page on the persistent storage device, and notifying the file system that a second subset of the plurality of logical block addresses of the page are empty;

the file system maps the first subset of the plurality of logical block addresses to physical storage locations of the data set stored within the persistent storage device, such that the second subset of the plurality of logical block addresses are unmapped to physical storage locations of the persistent storage device, and a physical storage capacity consumed by the page on the persistent storage device corresponds to a physical storage capacity represented by the first subset of the plurality of logical block addresses, smaller than the fixed amount of storage capacity represented by the plurality of logical block addresses of the page.

8. The apparatus of claim 7, wherein the file allocation manager identifies the second subset of the plurality of logical block addresses by use of an offset and a length.

9. The apparatus of claim 7, wherein the file allocation manager notifies the file system that the second subset of the plurality of logical block addresses are empty by one or more of an unmap message, a deallocation message, a TRIM message, and a TRIM directive.

10. The apparatus of claim 7, wherein the reduction engine derives the data set by compressing the data of the page.

11. A system comprising:

a storage controller configured to maintain storage metadata pertaining to logical identifiers of a logical address space, each logical identifier representing a sector of a non-volatile storage medium, the storage metadata to map logical identifiers that reference data stored on sectors of the non-volatile storage medium to physical addresses of the respective sectors, such that logical identifiers that do not reference data stored on the non-volatile storage medium are unmapped; and a compression agent that generates compressed data sets corresponding to pages, each page comprising a plurality of logical identifiers defined to represent a storage capacity corresponding to a fixed number of sectors of the non-volatile storage medium;

wherein the storage controller is further configured to persist pages on the non-volatile storage medium, wherein persisting a page comprises:

writing a compressed data set of the page on one or more sectors of the non-volatile storage medium, fewer than the fixed number of sectors; and mapping a first subset of the logical identifiers of the page to physical addresses of the one or more sectors in the storage metadata, such that a second subset of the logical identifiers of the page are unmapped, wherein a storage capacity of the non-volatile storage medium used by the plurality of logical identifiers comprising the page corresponds to a storage capacity of the one or more sectors, smaller than the fixed number of sectors.

12. The system of claim 11, wherein the storage metadata comprises an index, and wherein persisting the page further comprises:

associating the first subset of the logical identifiers of the page with the physical addresses in the index, and removing associations pertaining to the second subset of the logical identifiers of the page from the index.

13. The system of claim 11, wherein the storage controller is configured to write a modified compressed data set to the page, the modified compressed data set occupying fewer sectors than the compressed data set, wherein writing the modified compressed data set comprises removing a mapping for at least one of the logical identifiers of the first subset of the logical identifiers comprising the page from the storage metadata.

14. The system of claim 11, wherein the storage controller determines a physical storage capacity consumed by the page based on assignments between the first subset of the logical identifiers of the page and the one or more sectors of the non-volatile storage medium in the storage metadata.

15. The system of claim 11, wherein writing the compressed data set comprises sequentially appending the compressed data set to a storage log maintained on the non-volatile storage medium.

16. The system of claim 11, wherein the storage controller is further configured to write persistent metadata on the non-volatile storage medium that designates that the second subset of the logical identifiers comprising the page are unmapped, such that the second subset of the logical identifiers do not consume storage capacity of the non-volatile storage medium.

17. An apparatus, comprising:
a storage controller that writes a page comprising a plurality of logical identifiers of a logical address space to a storage device, by:
compressing data of the page from an uncompressed size to a smaller compressed size, the uncompressed size corresponding to a fixed amount of storage capacity represented by the page, the fixed amount comprising storage capacities represented by the plurality of logical identifiers comprising the page, and
writing the compressed data to one or more storage units of the storage device; and
a translation manager that associates a first subset of the plurality of logical identifiers comprising the page with the one or more storage units of the storage device and disassociates a second subset of the plurality of logical identifiers comprising the page from storage units of the storage device;
wherein a physical storage capacity occupied by the page on the storage device corresponds to a physical storage capacity of the one or more storage units mapped to the first subset of the plurality of logical identifiers comprising the page, smaller than the fixed amount of storage capacity represented by the plurality of logical identifiers comprising the page.

18. The apparatus of claim 17, wherein the storage controller is further configured to record persistent metadata on the storage device to indicate that the second subset of the plurality of logical identifiers comprising the page are not associated with data stored on the storage device.

19. The apparatus of claim 18, wherein the storage controller is configured to write at least a portion of the persistent metadata on the one or more storage units.

20. The apparatus of claim 17, wherein the storage controller determines the physical storage capacity occupied by the page on the storage device based on the associations between the first subset of the plurality of logical identifiers comprising the page and the one or more storage units.

21. The apparatus of claim 17, wherein the translation manager is further configured to remove associations between the second subset of the plurality of logical identifiers comprising the page and storage units of the storage device in response to writing the page to the storage device.

* * * * *